(12) United States Patent
Hornscheidt

(10) Patent No.: US 12,521,202 B2
(45) Date of Patent: Jan. 13, 2026

(54) MARKING ELEMENT FOR MARKING TISSUE

(71) Applicant: SOMATEX Medical Technologies GmbH, Berlin (DE)

(72) Inventor: Dirk Hornscheidt, Berlin (DE)

(73) Assignee: SOMATEX Medical Technologies GmbH, Berlin (DE)

( * ) Notice: Subject to any disclaimer, the term of this patent is extended or adjusted under 35 U.S.C. 154(b) by 45 days.

(21) Appl. No.: 17/781,191

(22) PCT Filed: Nov. 30, 2020

(86) PCT No.: PCT/EP2020/083949
§ 371 (c)(1),
(2) Date: May 31, 2022

(87) PCT Pub. No.: WO2021/105506
PCT Pub. Date: Jun. 3, 2021

(65) Prior Publication Data
US 2023/0000585 A1    Jan. 5, 2023

(30) Foreign Application Priority Data
Nov. 29, 2019   (DE) .................... 10 2019 132 558.7

(51) Int. Cl.
*A61B 90/00* (2016.01)
*A61B 17/00* (2006.01)
*A61B 17/34* (2006.01)

(52) U.S. Cl.
CPC .......... *A61B 90/39* (2016.02); *A61B 17/3468* (2013.01); *A61B 2017/00526* (2013.01);
(Continued)

(58) Field of Classification Search
CPC ................ A61B 90/39; A61B 17/3468; A61B 2017/00526; A61B 2017/00867; A61B 2090/3966; A61B 2090/3987
See application file for complete search history.

(56) References Cited

U.S. PATENT DOCUMENTS

| 4,863,470 A | 9/1989 | Carter |
| 5,645,558 A | 7/1997 | Horton |

(Continued)

FOREIGN PATENT DOCUMENTS

| CA | 3160617 | 6/2021 |
| CN | 109833102 | 6/2019 |

(Continued)

OTHER PUBLICATIONS

Evans et al. 2007 EuroInterv. 3:158-161 (Year: 2007).*
(Continued)

*Primary Examiner* — Keith M Raymond
*Assistant Examiner* — Patrick M Mehl
(74) *Attorney, Agent, or Firm* — Jones Robb, PLLC

(57) ABSTRACT

Marking device (100) for implantation into a tissue (260), having a support structure (102) which is formed by at least one elastic metal wire, is compressible and is self-expanding and which, in an expanded state, encompasses an interior space (104), characterized in that the marking device (100) is designed to transform itself on its own from a compressed state into an expanded state, even against a tissue pressure prevailing at a tissue site to be marked, and the marking device (100) in the expanded state has a hollow, approximately spherical shape.

20 Claims, 29 Drawing Sheets

Figure 1:
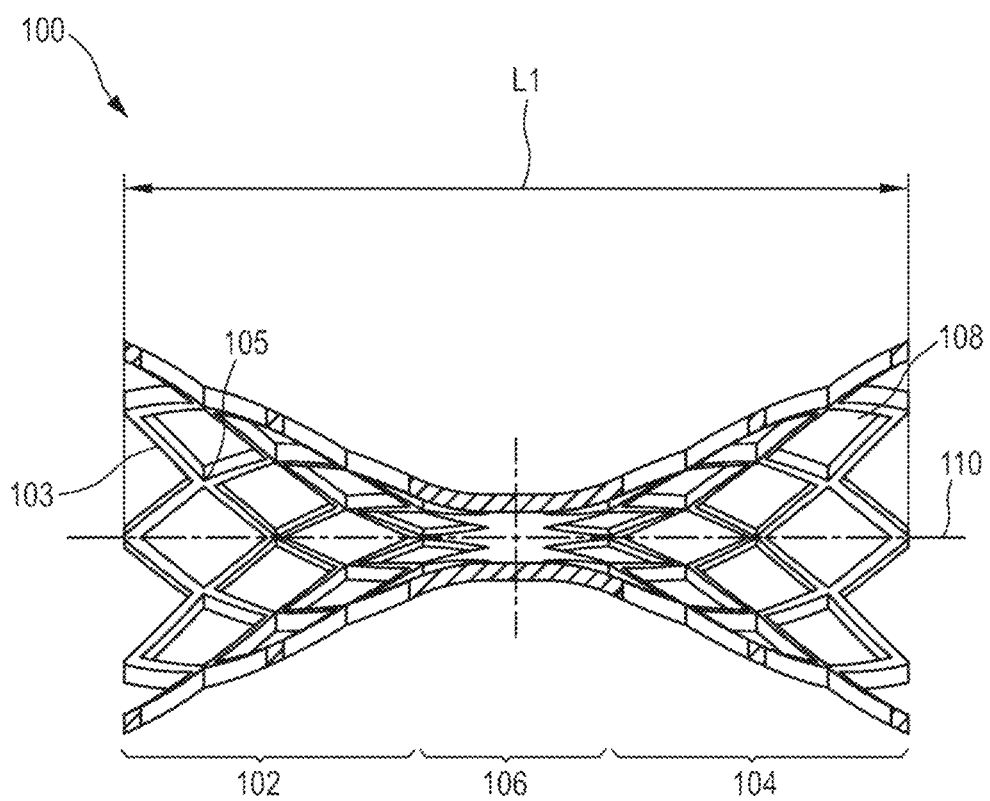

(52) U.S. Cl.
CPC .............. *A61B 2017/00867* (2013.01); *A61B 2090/3966* (2016.02); *A61B 2090/3987* (2016.02)

(56) References Cited

U.S. PATENT DOCUMENTS

| | | | |
|---|---|---|---|
| 5,766,219 | A | 6/1998 | Horton |
| 5,780,807 | A * | 7/1998 | Saunders ............ B23K 26/1462 29/557 |
| 6,090,125 | A | 7/2000 | Horton |
| 6,254,633 | B1 | 7/2001 | Pinchuk et al. |
| 6,356,782 | B1 | 3/2002 | Sirimanne et al. |
| 6,371,904 | B1 | 4/2002 | Sirimanne et al. |
| 6,428,558 | B1 | 8/2002 | Jones et al. |
| 6,635,069 | B1 | 10/2003 | Teoh et al. |
| 6,638,291 | B1 | 10/2003 | Ferrera et al. |
| 6,725,083 | B1 | 4/2004 | Burbank et al. |
| 6,766,186 | B1 | 7/2004 | Hoyns et al. |
| 6,860,893 | B2 | 3/2005 | Wallace et al. |
| 6,929,654 | B2 | 8/2005 | Teoh et al. |
| 7,424,320 | B2 | 9/2008 | Chesbrough et al. |
| 7,565,191 | B2 | 7/2009 | Burbank et al. |
| 7,637,948 | B2 | 12/2009 | Corbitt, Jr. |
| 7,668,582 | B2 | 2/2010 | Sirimanne et al. |
| 8,060,183 | B2 | 11/2011 | Leopold et al. |
| 8,112,869 | B2 | 2/2012 | Jenks et al. |
| 8,224,424 | B2 | 7/2012 | Burbank et al. |
| 8,280,486 | B2 | 10/2012 | Miller et al. |
| 8,306,602 | B2 | 11/2012 | Sirimanne et al. |
| 8,311,610 | B2 | 11/2012 | Ranpura |
| 8,320,993 | B2 | 11/2012 | Sirimanne et al. |
| 8,320,994 | B2 | 11/2012 | Sirimanne et al. |
| 8,442,623 | B2 | 5/2013 | Nicoson et al. |
| 8,480,706 | B2 | 7/2013 | Chanduszko et al. |
| 8,600,481 | B2 | 12/2013 | Sirimanne et al. |
| 8,718,745 | B2 | 5/2014 | Burbank et al. |
| 8,747,597 | B2 | 6/2014 | Rosqueta et al. |
| 9,095,342 | B2 | 8/2015 | Becking et al. |
| 9,149,263 | B2 | 10/2015 | Chanduszko |
| 9,216,069 | B2 | 12/2015 | Foerster et al. |
| 9,271,736 | B2 | 3/2016 | Heipl |
| 9,380,998 | B2 | 7/2016 | Sirimanne et al. |
| D767,138 | S | 9/2016 | Apostolidis |
| 9,492,570 | B2 | 11/2016 | Sirimanne et al. |
| 9,526,648 | B2 | 12/2016 | Sharma |
| 9,585,669 | B2 | 3/2017 | Becking et al. |
| 9,669,113 | B1 | 6/2017 | Sirimanne et al. |
| 9,861,346 | B2 | 1/2018 | Callaghan |
| 9,986,974 | B2 | 6/2018 | Sirimanne et al. |
| 10,156,030 | B2 | 12/2018 | Koppe |
| 10,413,381 | B2 | 9/2019 | Hermann et al. |
| 10,463,376 | B2 | 11/2019 | Bodewadt et al. |
| 10,500,014 | B2 | 12/2019 | Hermann et al. |
| 10,709,453 | B2 | 7/2020 | Suzuki |
| 10,808,341 | B2 | 10/2020 | Koppe |
| 11,191,611 | B2 | 12/2021 | Hornscheidt et al. |
| 11,779,432 | B2 | 10/2023 | Hornscheidt et al. |
| 12,150,822 | B2 | 11/2024 | Hornscheidt et al. |
| 2003/0040772 | A1 * | 2/2003 | Hyodoh ................ A61F 2/90 606/200 |
| 2005/0049489 | A1 | 3/2005 | Foerster et al. |
| 2006/0079805 | A1 | 4/2006 | Miller et al. |
| 2006/0247530 | A1 * | 11/2006 | Hardin ................ A61B 17/221 600/466 |
| 2007/0118176 | A1 * | 5/2007 | Opolski ........... A61B 17/12172 606/213 |
| 2007/0135826 | A1 | 6/2007 | Zaver et al. |
| 2008/0097190 | A1 | 4/2008 | Hornscheidt et al. |
| 2009/0000629 | A1 * | 1/2009 | Hornscheidt ......... A61B 90/39 604/116 |
| 2009/0216263 | A1 | 8/2009 | Tekulve |
| 2010/0063458 | A1 | 3/2010 | Barr |
| 2010/0234726 | A1 | 9/2010 | Sirimanne et al. |
| 2011/0160763 | A1 * | 6/2011 | Ferrera ............ A61B 17/12118 606/200 |
| 2013/0018259 | A1 | 1/2013 | Borillo et al. |
| 2013/0066195 | A1 | 3/2013 | Sirimanne et al. |
| 2013/0123830 | A1 | 5/2013 | Becking et al. |
| 2013/0211495 | A1 | 8/2013 | Halden et al. |
| 2013/0289389 | A1 | 10/2013 | Hermann et al. |
| 2014/0051996 | A1 | 2/2014 | Sirimanne et al. |
| 2014/0243675 | A1 | 8/2014 | Burbank et al. |
| 2014/0371778 | A1 | 12/2014 | Rudakov et al. |
| 2015/0005804 | A1 | 1/2015 | Franano et al. |
| 2015/0190141 | A1 | 7/2015 | Cragg et al. |
| 2015/0238197 | A1 | 8/2015 | Quinn et al. |
| 2016/0074023 | A1 | 3/2016 | Sakamoto et al. |
| 2016/0213380 | A1 | 7/2016 | O'Brien et al. |
| 2016/0346453 | A1 | 12/2016 | McGuckin, Jr. et al. |
| 2017/0086852 | A1 | 3/2017 | Martinez et al. |
| 2017/0086854 | A1 | 3/2017 | Cragg et al. |
| 2017/0156733 | A1 | 6/2017 | Becking et al. |
| 2017/0245864 | A1 | 8/2017 | Franano et al. |
| 2017/0367710 | A1 | 12/2017 | Yang |
| 2018/0206851 | A1 | 7/2018 | Nalzman |
| 2018/0344425 | A1 | 12/2018 | Burbank et al. |
| 2019/0021810 | A1 | 1/2019 | He et al. |
| 2019/0076212 | A1 | 3/2019 | Liu |
| 2019/0175184 | A1 | 6/2019 | Hui et al. |
| 2019/0201160 | A1 | 7/2019 | Hornscheidt et al. |
| 2019/0262002 | A1 | 8/2019 | Benjamin |
| 2019/0282325 | A1 | 9/2019 | Alvarez et al. |
| 2019/0314034 | A1 | 10/2019 | Cragg et al. |
| 2020/0054413 | A1 | 2/2020 | Vogel |
| 2020/0113647 | A1 | 4/2020 | Hermann et al. |
| 2020/0163659 | A1 | 5/2020 | Cahill |
| 2020/0178764 | A1 | 6/2020 | Ibrahim et al. |
| 2020/0340154 | A1 | 10/2020 | Koppe |
| 2020/0367904 | A1 | 11/2020 | Becking et al. |
| 2021/0022765 | A1 | 1/2021 | Walzman |
| 2022/0192778 | A1 | 6/2022 | Hornscheidt et al. |
| 2023/0000586 | A1 | 1/2023 | Rieger et al. |
| 2024/0065802 | A1 | 2/2024 | Hornscheidt et al. |

FOREIGN PATENT DOCUMENTS

| | | | |
|---|---|---|---|
| DE | 69921508 | | 2/2006 |
| DE | 102016110350 | A1 | 12/2017 |
| EP | 0765636 | | 4/1997 |
| EP | 1125553 | | 8/2001 |
| EP | 1782745 | | 5/2007 |
| EP | 1574169 | B1 | 1/2017 |
| EP | 3434220 | | 1/2019 |
| EP | 2893902 | B1 | 6/2021 |
| EP | 4065034 | | 10/2022 |
| WO | 2006000568 | A2 | 1/2006 |
| WO | 2014153267 | A1 | 3/2014 |
| WO | 2014168750 | A1 | 10/2014 |
| WO | 2014169261 | A1 | 10/2014 |
| WO | 2017051248 | A1 | 3/2017 |
| WO | 2017162126 | A1 | 9/2017 |
| WO | WO-2017207777 | A1 * | 12/2017 ............. A61B 90/39 |
| WO | 2019086684 | | 5/2019 |
| WO | 2019118374 | A1 | 6/2019 |
| WO | 2020243474 | A1 | 12/2020 |
| WO | 2021105506 | | 6/2021 |
| WO | 2021105511 | | 6/2021 |

OTHER PUBLICATIONS

International Search Report and Written Opinion from International Patent Application No. PCT/EP2017063529, dated Aug. 21, 2017.
Office Action dated Feb. 17, 2021 in U.S. Appl. No. 16/302,921.
Notice of Allowance dated Aug. 4, 2021 in U.S. Appl. No. 16/302,921.
Specification and Drawings in U.S. Appl. No. 62/379,891, filed Aug. 26, 2016.
International Search Report and Written Opinion for PCT/EP2020/083972 dated Feb. 22, 2021, 15 pages.
Notice of Allowance dated Jun. 7, 2023 in U.S. Appl. No. 17/526,539, 20 pages.
Harty Eoin: "Inserting peripheral intravenous cannulae—tips and tricks", Update in Anesthesia, vol. 27,1, Nov. 1, 2012 (Nov. 1, 2012), pp. 22-26, XP093009799.

(56) References Cited

OTHER PUBLICATIONS

Office Action dated Feb. 1, 2023 in European Patent Application No. 17727234.1.
Specification and Drawings in U.S. Appl. No. 18/461,076, filed Sep. 5, 2023.
Office Action dated Oct. 5, 2023 received in Canadian Patent Application No. 3,162,950.
Office Action dated Oct. 12, 2023 received in Canadian Patent Application No. 3,160,617.
International Search Report and Written Opinion for PCT/EP2020/083949 dated Feb. 22, 2021, 15 pages.
Office Action dated Jul. 23, 2024 received in JP Application No. 2022-532093.
Office Action dated May 29, 2024 in U.S. Appl. No. 17/781,194, 17 pp.
Office Action dated Jul. 3, 2024 in EP Application No. 17727234.1.
Notice of Allowance dated Jul. 17, 2024 in U.S. Appl. No. 18/461,076.
Office Action dated Aug. 26, 2024 received in counterpart JP Application No. 2022-532049.
Corrected Notice of Allowabily dated Aug. 28, 2024 in U.S. Appl. No. 18/461,076.
Specification and Drawings filed Sep. 19, 2024 in Design U.S. Appl. No. 29/963,815.
Specification and Drawings filed Sep. 19, 2024 in Design U.S. Appl. No. 29/963,869.
Specification and Drawings filed Nov. 4, 2024 in related U.S. Appl. No. 18/936,173.
Office Action dated Dec. 2, 2024 received in EP Patent Application No. 20819656.8.
Office Action dated Dec. 2, 2024 received in EP Patent Application No. 208172551.1.
Office Action dated Dec. 31, 2024 received in CN Patent Application No. 202080082625.0.
Office Action dated Feb. 25, 2025 received in JP Patent Application No. 2022-532049.
Office Action dated Jul. 7, 2025 received in CN Patent Application No. 202080082625.0.
Office Action dated Jul. 11, 2025 in CA Patent Application No. 3,160,617.

* cited by examiner

MARKING ELEMENT FOR MARKING TISSUE

This application is a U.S. national stage application under 35 U.S.C. § 371(c) of International Application No. PCT/EP2020/083949, filed Nov. 30, 2020, which claims priority to German Patent Application No. 10 2019 132 558.7, filed Nov. 29, 2019, the entire content of each of which is incorporated by reference herein.

The invention relates to a marking body provided for implantation into soft tissue (e.g., fatty tissue, muscle tissue, tumor tissue, breast tissue, liver tissue, lymph nodes, in particular the axillary lymph nodes, or the like), having an elastic, compressible and self-expanding support structure. The support structure is formed by elastic and preformed webs. The marking body has a shape that is at least approximately rotationally symmetric about a longitudinal axis. The invention furthermore relates to an implantation system and a method for implantation.

Implantable marking bodies for labeling tissue sites are well known. As a rule, such marking bodies are designed so that they can be implanted in the tissue region to be labeled by way of a suitable apparatus, in order to remain there permanently or over a certain period of time, for example between two interventions. In this way, tissue relevant to the treatment, for example tissue containing tumors or other tissue abnormalities or else potentially healthy tissue intended to be observed, can be labeled for a relatively long period of time. The labeling effect of these marking bodies is attained as a result of the visibility thereof during examinations using methods of imaging diagnostics, in particular in the case of methods based on x-ray radiation, nuclear magnetic resonance or ultrasonic waves.

WO 2006/000568 A2 discloses a marker for marking a tissue site following the insertion of said marker using an applicator or cannula with a known structure. What is attained here is that the marker remains at the tissue site to be marked for a relatively long time and consequently clearly marks a tissue site for a subsequent diagnostic and therapeutic activity. The marker consists of one or more wires which are twisted in the central marker section and which may have different shapes at the two end sections of the marker.

A surgical instrument, more particularly a marker instrument for marking body tissue sections, is furthermore described in EP 1 782 745 B1. In particular, the instrument should be suitable for marking tumor tissue prior to the surgical removal of said tissue.

From the field of surgical orthopedics for treating bone necrosis, U.S. Pat. No. 8,112,869 B2 has disclosed a manufacturing method for producing spherical cage structures consisting of nitinol. The cage structures produced in accordance with the method described therein are provided for stabilizing the femoral head by virtue of being introduced in compressed form via a channel drilled into the femur, expanding in the femoral head and cavities subsequently being filled with solidifying bone graft. In this field of application, the diameters of the cage structures range between 20 and 30 mm.

U.S. Pat. No. 9,216,069 B2 describes a marker system for breast biopsy, in which a multiplicity of marker elements are pre-loaded in compressed fashion in an administering tube, said marker elements containing at least one radiopaque wire segment.

For breast biopsies, U.S. Pat. No. 8,060,183 B2 discloses, in general, markers that enclose a cavity for labeling in imaging methods. In one variant, the marker consists of an outer hollow body closed at both elongate ends and a smaller permanent marker situated within the outer body. The description goes on to explain that the outer hollow body consists of a bioresorbable material and decomposes over a certain period of time while the inner permanent marker continues to remain in the tissue.

It is an object of the invention to specify an improved marking body for implantation in a tissue.

A marking body as claimed in claim 1 is proposed for achieving this object. Accordingly, the marking body has an at least approximately rotationally symmetric shape about a longitudinal axis, and is able to adopt a radially compressed and a radially expanded state. The marking body is formed by elastic and preformed webs which yield an elastic, compressible and self-expandable support structure. By way of example, the webs are interconnected by weaving or in any other way. In its expanded state, the marking body is constricted in a central longitudinal section and starting from the central longitudinal section widens to both longitudinal ends in the longitudinal direction such that it has two flared longitudinal sections which for example may each have an approximately conical shape, with the cone tips being in contact. In the expanded state of the marking body, the maximum external diameter of the flared longitudinal sections is two times to twenty times larger than the external diameter of the central longitudinal section. At least in the flared longitudinal sections, the marking body is formed by 5 to 96 webs in the circumferential direction, said webs extending substantially in the longitudinal direction of the marking body in the compressed state of the latter and crossing pairwise at their longitudinal ends and being interconnected in cohesive and/or interlocking fashion. Extending substantially in the longitudinal direction of the marking body means that, in the compressed state of the marking body, the webs extend at an angle of less than 10° with respect to the longitudinal axis of the marking body.

Such a marking body can advantageously meet two requirements: firstly, it offers good ultrasound visibility and secondly it counteracts a migration, that is to say movement of the marking body in the tissue during and after implantation.

Should a biopsy, for example a vacuum biopsy, have been carried out before marking, the tissue pressure acting against the propagation direction of the marking body may be accordingly lower or nonexistent on account of an already present cavity. In such a case, the expansion of the marking body after placement prevents the marking body falling back into the biopsy cannula or being rinsed away through the puncture channel of the vacuum biopsy unit.

An implantation system having a marking body and an implantation apparatus is proposed as a further aspect of the invention.

The invention is based on the idea that the visibility of the marking bodies should be ensured even in the case of imaging methods that are based on different operational principles. Furthermore, the unique and clear visibility of marking bodies should be ensured under the largest possible range of examination conditions and application cases. In the case of ultrasound-based imaging methods, a good recognizability of the marking body arises by way of the highest possible sound reflection of the support structure formed by metal or hard plastic.

In the case of sonography with medical ultrasound ranging from 1 MHz to 40 MHz in the B-mode (brightness modulation), the support structure of the marking body causes incident ultrasound waves to a structure, circular in cross section, transversely to both longitudinal ends of the marking body. What is obtained by matching the parameters of web diameter (or width and thickness), web number, web density and web material is that only some of the acoustic energy is reflected by the structure and the remaining part of the energy is transmitted. As a result, a full circle arises as a representation in the ultrasound image. In the case of other structures of this form, the ultrasound energy is largely reflected at the first surface of the marker and a shadow arises in the image.

A further feature of the chosen marking body geometry consists as a result of the fact that incident ultrasound waves at both longitudinal ends of the marking body on a in the cross section, a cross can be identified in the ultrasonic image instead of the circle. Both geometries, the circle and the cross, do not occur in the ultrasound image of the biological tissue in this form and can therefore be recognized particularly easily, and can be assigned to the marking body, by the investigator.

In the case of x-ray-based imaging methods, too, for example in mammography, a high absorption of the x-ray radiation by the support structure leads to good recognizability in the x-ray image. The high absorption of the x-ray radiation by the support structure can be traced back to the metal in the support structure, for example the metal wires or the metal particles embedded in plastic.

In the case of magnetic resonance imaging (MRI), the magnetic properties of the material of the marking body lead to its good recognizability.

Advantageous developments of the invention can be gathered from the dependent claims and, in detail, specify advantageous options of realizing the above-described concept within the scope of the problem and in respect of further advantages.

In particular, provision is made for the support structure to be woven, braided, wound or knitted. The advantage here consists in the economical producibility of a structure that is spread out over an area, which, within the scope of a subsequent production step, is brought into a hollow, double cone-shaped form whose conical tips meet at the center.

Alternatively, the support structure can be formed by a tube that is slotted in the longitudinal direction and compressed such that the sections separated from one another by the slits bulge to the outside. If the compressed state of such a support structure is its relaxed state, the support structure is self-expanding.

A further alternative for the support structure is a support structure made of plastic, for example a marking body manufactured within the scope of an injection molding method, for example made of PEEK.

The support structure of the marking body is preferably designed in such a way that it is self-expanding and can be elastically compressed under a radial force of at least one newton. If the marking body is implanted in the tissue in the elastically compressed state, the marking body independently transitions into its expanded state and keeps the latter if the tissue exerts a radial force of less than one newton on the marking body.

For implantation purposes, the marking body is initially brought to the desired location by means of a cannula and is then pushed out of the lumen of the cannula such that it can subsequently flare in the tissue. The expansion force with which the marking body kept in a compressed state in the cannula flares immediately following the ejection from the cannula is preferably at least 1 newton.

By way of example, the support structure of the marking body can be designed in such a way that the latter has an expansion force which is more than 40 newtons in a state of the marking body where it has been compressed to less than 1 mm maximum diameter and still is more than three newtons, for example six newtons, in the case of a maximum diameter of 1.5 mm. The support structure of the marking body can be designed in such a way that its expansion force substantially corresponds to the minimum radial force that needs to be applied to elastically compress the marking body.

The energy stored in the support structure of the marking body can be adjusted by a suitable choice of the web thickness of the webs of the support structure or the number of webs of the support structure. The energy stored in the support structure of the elastically compressed marking body furthermore depends on the material that forms the webs of the support structure of the marking body. Accordingly, it is possible to also produce the marking body according to the invention in such a way that a radial force of more than 1.5 newtons, two newtons or even more than three newtons must be applied to compress the marking body to a maximum diameter of less than 1.5 mm. It is likewise possible to produce the marking body according to the invention in such a way that a radial force of 0.5 newtons is already sufficient to compress the marking body to a maximum diameter of less than 1.5 mm.

Since the support structure of the marking body is designed to be self-expanding, the marking body independently transitions into its expanded state as soon as the radial force drops below levels required to elastically compress the marking body. The support structure of the marking body is preferably formed by braided individual wires. Accordingly, the webs of the marking body are preferably formed by 5 to 96 wires, for example 18 to 48 wires and in particular 24 or 36 wires, which each extend from one to the other longitudinal end of the marking body and which cross over one another multiple times and thus form a web-like support structure made of a braided wire mesh with a multiplicity of crossing points. A marking body formed by 12 to 48, in particular 24 braided wires preferably consisting of a titanium alloy, in particular nitinol, is particularly preferred.

The webs of the marking body, that is to say for example the wires, are in this case interconnected, preferably pairwise interconnected, at their free longitudinal ends and are particularly preferably welded, in particular twisted and welded. To this end, the free longitudinal ends are preferably each located on a crossing point of the support structure, that is to say for example where the wires in the braided wire mesh cross.

The webs of the marking body may also be cohesively interconnected, in particular welded, at the crossing points. However, this is preferably not envisaged.

Alternatively or in addition, the webs of the marking body can be twisted with one another at the crossing points.

In the expanded state of the marking body, the external diameter of the latter preferably increases continuously in the longitudinal direction to both the longitudinal ends starting from the central longitudinal section, and so the marking body has its maximum diameter at both its longitudinal ends.

In an alternative embodiment variant, the external diameter of the marking body, in its expanded state, initially increases in the longitudinal direction to both longitudinal ends starting from the central longitudinal section and then reduces again over the further course to the longitudinal ends, and so the marking body has its maximum diameter at a distance from its respective longitudinal ends.

In both cases, the marking body ideally has the same maximum diameter in the flared longitudinal sections. In practice, the two maximum diameters however typically deviate slightly from one another but the difference of the maximum diameters in the radially unloaded state of the marking body is preferably less than 10%.

In the expanded state, the marking body preferably flares in the flared longitudinal sections starting from the central longitudinal section under an opening angle which—in relation to a longitudinal axis of the marking body—is between 25° and 50°, in particular between 30° and 45°.

In the case of a marking body formed from braided wires, the wire diameter is preferably less than 0.5 mm, preferably less than or equal to 0.1 mm, for example between 0.05 mm and 0.10 mm. A small wire diameter in this case has a positive effect on the compressibility of the marking body, which is required in the case of implantation by way of a cannula with the smallest possible diameter. By contrast, a greater wire diameter has a positive influence on the set-up force of the support structure of the marking body. This leads to the marking body also being able to expand against tissue pressure prevalent in a hard tissue, for example tumor tissue.

Furthermore, it is advantageous if the diameter of the marking body in the expanded state is less than 10 mm or less than 8 mm, preferably between 3.0 mm and 5.0 mm. A marking body in this diameter range represents a compromise between visibility in imaging methods on the one hand and the spatial requirement of a foreign body in the tissue on the other hand.

An expanded marking body with a certain minimum size offers the advantage that it can be sensed by a surgeon during the treatment.

Furthermore, it is preferable for the diameter of the marking body in the compressed state to be less than 3 mm, preferably less than 1.0 mm. A small diameter in the elastically compressed state or a significant compressibility of the marking body facilitates an implantation of the marking body using a relatively thin cannula, that is to say a cannula with a small diameter. A smaller diameter reduces the risk to the patient in relation to injury and pain, and a stab incision and/or anesthetics can be dispensed with more frequently within the scope of simplified handling. This furthermore yields advantages in respect of application duration and costs.

Preferably, the support structure, for example its wires and/or sleeve, has been roughened, for example by sandblasting, in order to thus increase ultrasound visibility.

The webs of the marking body preferably consist of a titanium alloy, in particular nitinol. On account of the material properties of nitinol as a superelastic material, this leads to the marking body advantageously independently transitioning from an elastically compressed state to an expanded state after being driven out of the implantation apparatus, in particular transitioning against the pressure which acts against the expansion direction and is developed by the tissue adjoining the marking body. The use of further superelastic materials and/or shape-memory alloys is also possible.

By way of example, a fast self-expansion of the marking body post-implantation, as facilitated by the use of nitinol, is decisive for preventing a migration of the marking body, especially during and after the implantation.

Furthermore, provision is advantageously made for the material of the support structure to not be resorbable. This aspect of the invention leads to the advantage that the marking body which, as a rule, remains in the tissue for a relatively long period of time, does not deteriorate. This also prevents the marking body from disadvantageously interacting with the adjacent tissue, in particular by releasing contents or material constituents of the support structure to the adjacent tissue.

The wires of a support structure formed by a multiplicity of wires need not all consist of the same material. Rather, individual wires made of different materials may also be included in the braid in order to optimize the visibility in magnetic resonance imaging or else increase the x-ray visibility in computed tomography or under C-arms. By way of example, suitable materials include titanium, gold, iron-containing alloys and/or nitinol.

Especially if the support structure of the marking body is formed by a braided wire mesh, the central longitudinal section can be provided with a sleeve which compresses the central longitudinal section to a minimum diameter, to be precise preferably in such a way that all webs are directly adjacent to one another laterally within the central longitudinal section. The sleeve has the further effect of holding all individual wires together, for example in clamping fashion, such that a connection of the individual wires at their longitudinal ends is obsolete but may be provided for reasons of redundancy.

The sleeve preferably is a nitinol sleeve. In place of a nitinol sleeve, it is also possible to use other clamps, for example sleeves made of a different material. Such clamps may also have different shapes. By way of example, the clamps can therefore differ from one another in terms of shape and length. This allows the use of marking bodies with different clamps such that individual marking bodies can also be identified on an individual basis following implantation.

Further distinguishing features of individual marking bodies can be clamps made of different material, for example clamps that are more radiopaque or less radiopaque or else clamps with different magnetic properties, especially for differentiation in images recorded by magnetic resonance imaging. Clamps with air/gas inclusions may bring about improved recognizability in the ultrasound image.

Furthermore, provision is advantageously made for the marking body also to contain labeling features, e.g., sleeves of different shape and/or length, in particular metallic or other radiopaque molded parts within the support structure, complementing or in addition to the support structure. Amongst other things, the advantage obtained thereby is that a plurality of different marking bodies implanted simultaneously in a patient can be clearly distinguished, or at least be distinguished more easily, in imaging methods. By way of example, these molded parts can be rods or spheres located within the support structure or fastened to the support structure, and can furthermore have different dimensions for improved distinguishability. By way of example, these molded parts can be formed from metal.

A further aspect relates to an implantation system having a marking body of the type claimed here, and to an implantation apparatus.

The implantation apparatus is designed for implantation of the marking body according to the invention and comprises a cannula to this end. Consequently, by way of the implantation apparatus, the marking body can advantageously be placed at the tissue site to be labeled by puncturing the skin layers and the tissue located therebelow, with imaging methods being used in particular. Advantageously, provision is made for the external diameter of the cannula of the implantation apparatus to be less than 3 mm, preferably between 1.6 mm and 1.2 mm. This leads to the advantage that the marking body can be implanted percutaneously, in particular on account of the small cannula diameter. In particular, a small external cannula diameter facilitates an implantation of the marking body without having to resort to a stab incision of the skin at the entry site of the cannula or anesthetization of the relevant tissue.

As a result of the overall system, the marking body can be applied together with a suitable implantation apparatus that fits in terms of dimensions. In particular, the implantation system as overall system comprising both marking body and implantation apparatus may in the delivery state contain the marking body already in the compressed state within the cannula, and so the method step of compressing the marking body and pre-loading the implantation apparatus is dispensed with for the user and the application is further simplified in this way.

A method for producing a marking body is also proposed according to the invention. The latter comprises the following steps:
  providing a tubular braided wire mesh which is formed by 5 to 96 braided individual wires, and
  constricting the braided wire mesh in a central longitudinal section such that the braided wire mesh starting from the central longitudinal section widens on both sides in the longitudinal direction and forms two flared longitudinal sections.

Preferably, the method includes the following further method steps:
  braiding individual wires to form a tube such that the individual wires alternately cross over and under one another at crossing points, the crossing points being approximately arranged on crossing point planes which extend transversely to a longitudinal axis of the tube, and
  separating a tube section by laser cutting the wires at all crossing points in a separation plane, which is a crossing point plane, for providing the tubular braided wire mesh. The tubular braided wire mesh separated from the tube can subsequently be shaped into the marking body.

Preferably, the individual wires are welded pairwise to one another upon separation.

Preferably, the individual wires are twisted around one another at crossing point planes provided as separation planes by virtue of the respective two individual wires being wound around one another through at least 180°, preferably 360°, 540° or 720°.

Preferably, the individual wires cross over or under one another 8 to 12 times, preferably 9 to 11 times or 10 times between the longitudinal ends of the tubular braided wire mesh. Accordingly, every ninth to thirteenth, preferably each tenth, eleventh or twelfth crossing point plane of the tube braided from individual wires represents a separation plane where the individual wires are twisted around one another, preferably pairwise.

A marking body of the type presented here serves for percutaneous marking in the soft tissue, for example breast tissue, and for marking axillary lymph nodes following a lymph node biopsy.

The fields of application include the marking of suspicious tissue, the marking of lesions before or during chemotherapy, and the marking of a biopsy removal site. The location of a removed tumor may likewise be marked for improved orientation within the scope of radiation treatment planning.

The marking body can be used as set forth below within the scope of an intervention:
  Initially, the marking body is implanted at a desired site by virtue of the distal end of a cannula of an implantation apparatus being pierced up to the desired implantation location in body tissue and a marking body being ejected from the distal end of the cannula. Alternatively, the cannula tip of the implantation apparatus can also be brought to the desired implantation location through a port already placed into the patient.

Subsequently, the body tissue can be examined using an imaging ultrasound method, an ultrasound recording of the marked tissue being made. The marking body can be recognized in the ultrasound recording on account of a circular or X-shaped artifact.

Preferably, the marking body is used for marking in fatty tissue, muscle tissue, tumor tissue, breast tissue, liver tissue and/or lymph nodes, in particular the axillary lymph nodes.

Figure 2:
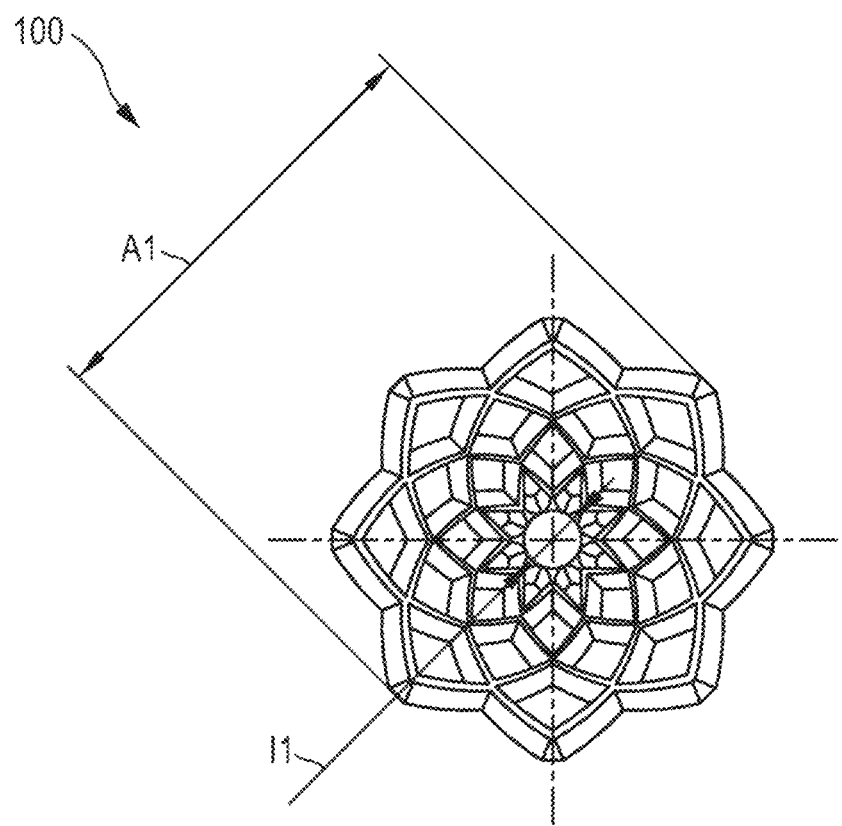
Figure 3:
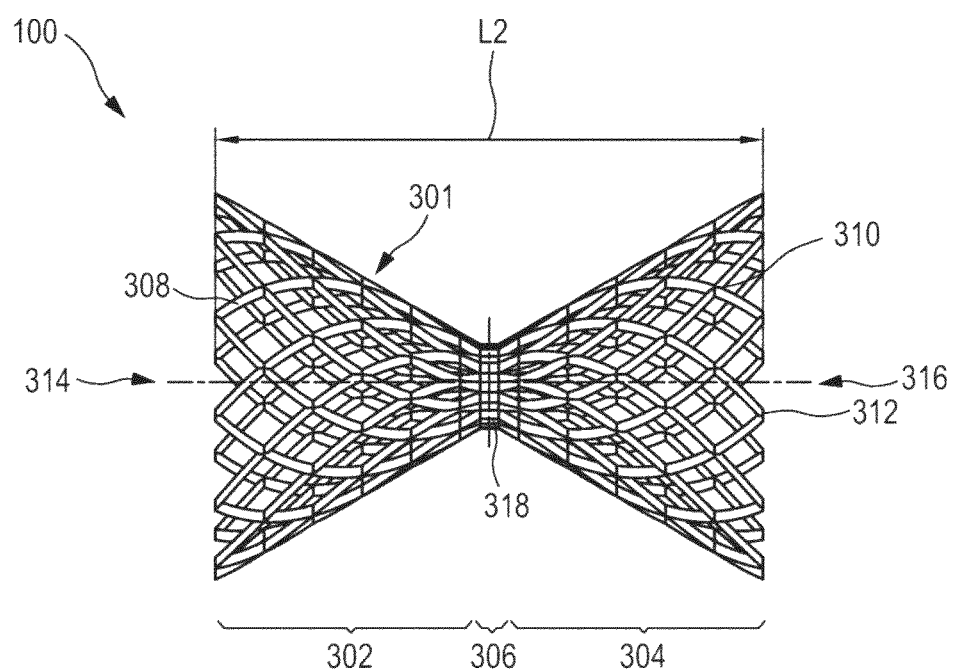
Figure 4:
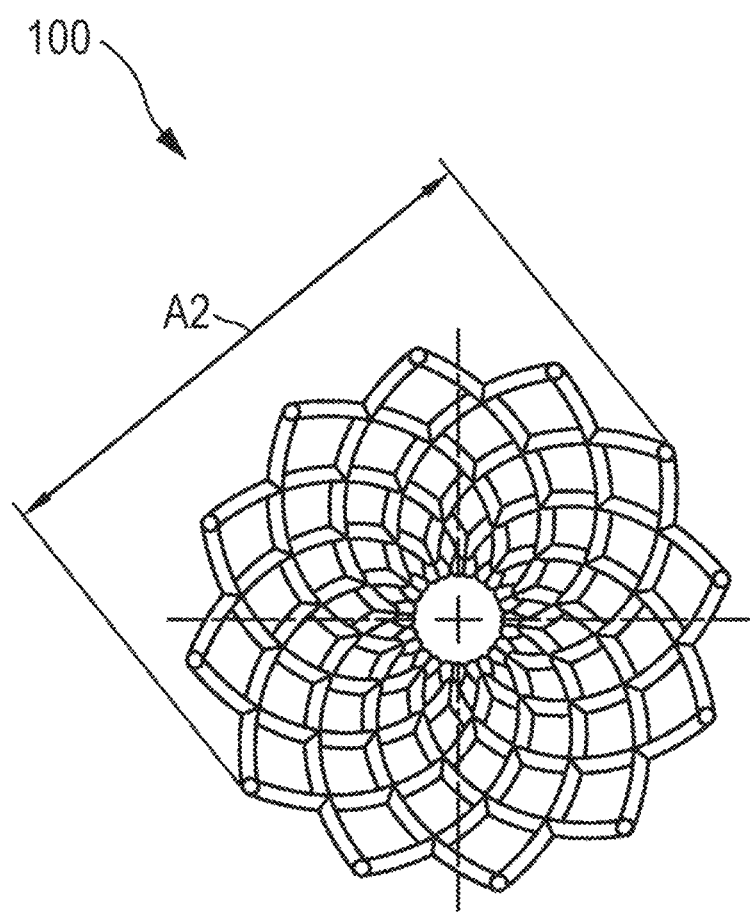
Figure 5:
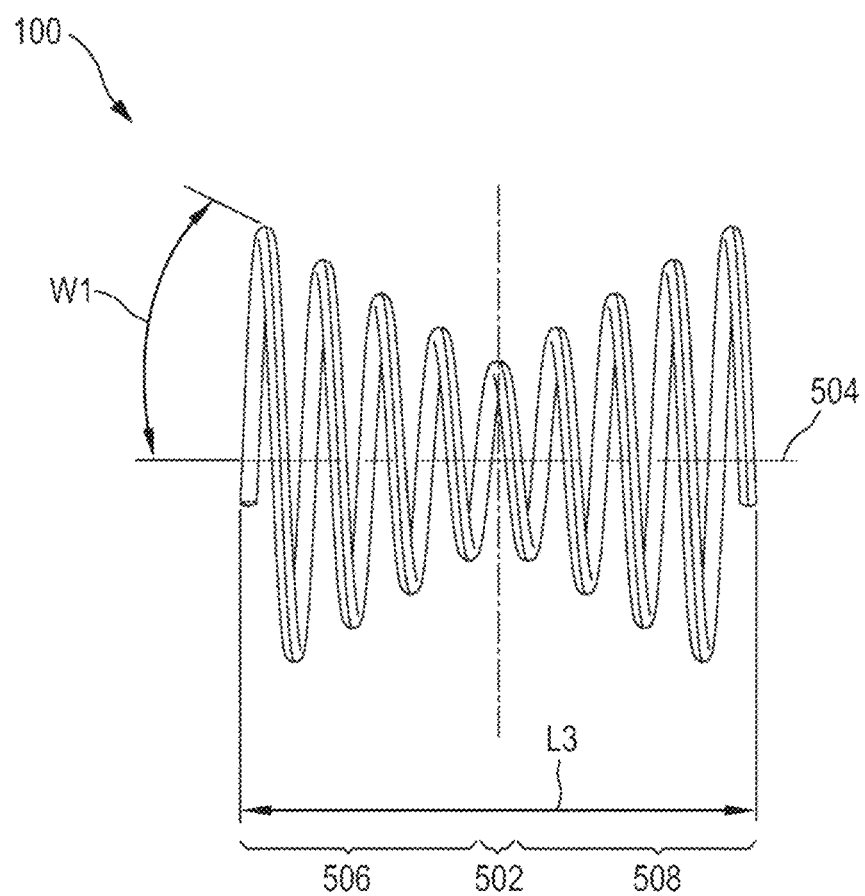
Figure 6:
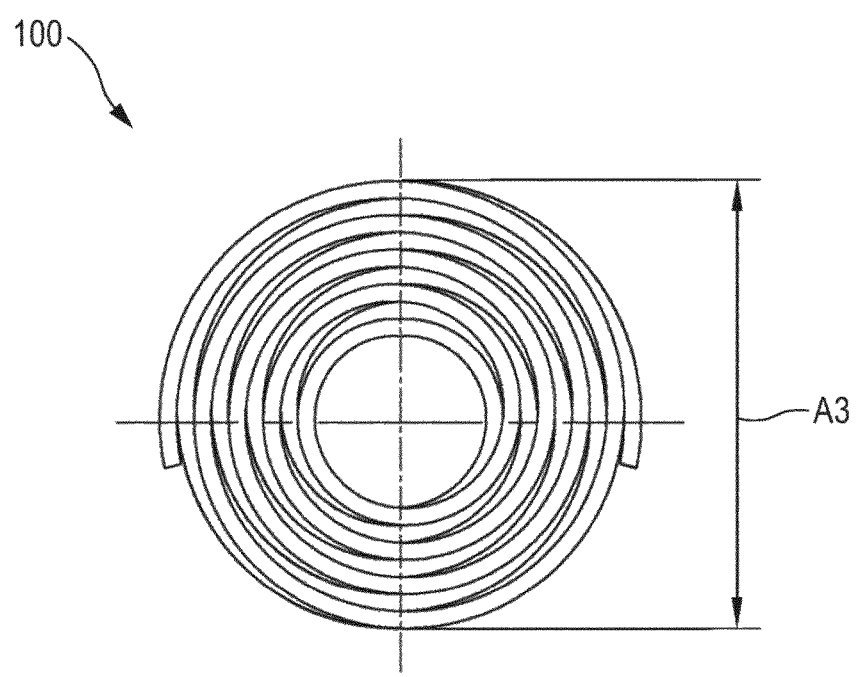
Figure 7:
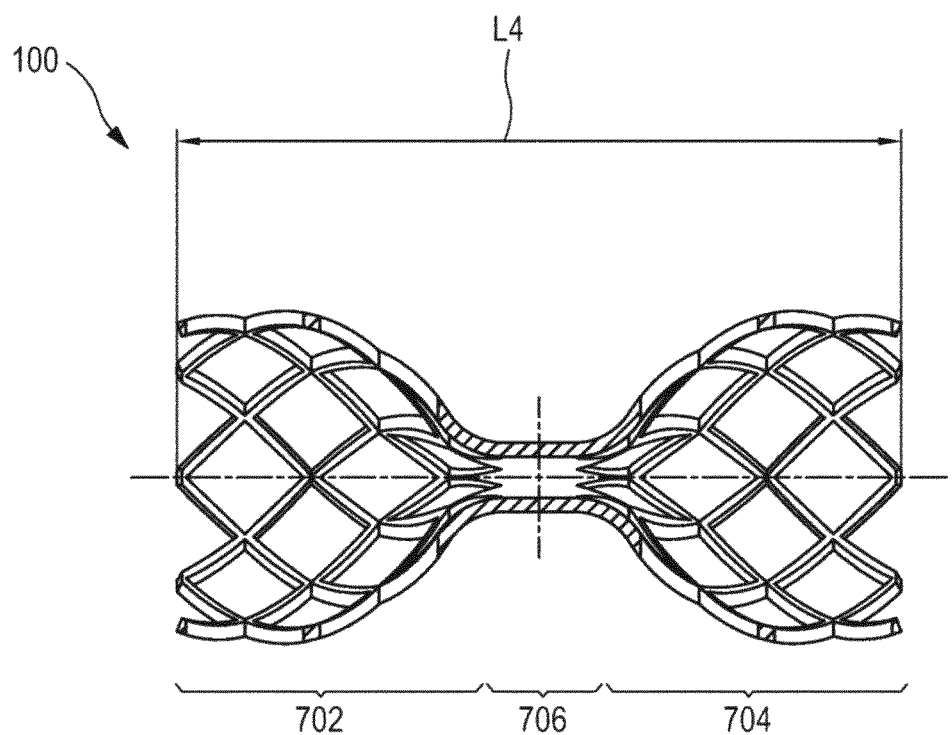
Figure 8:
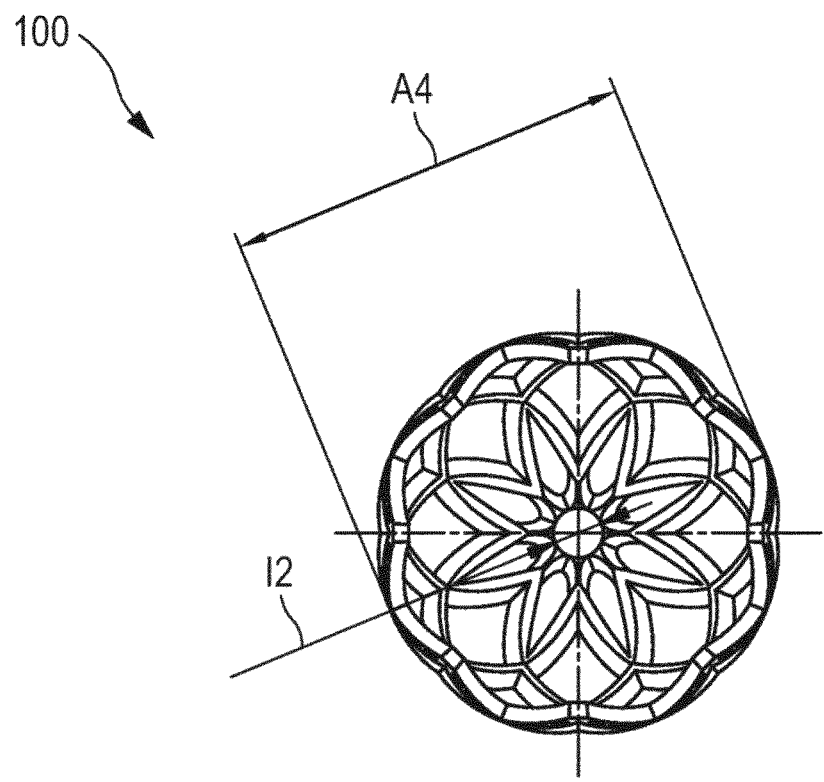
Figure 9:
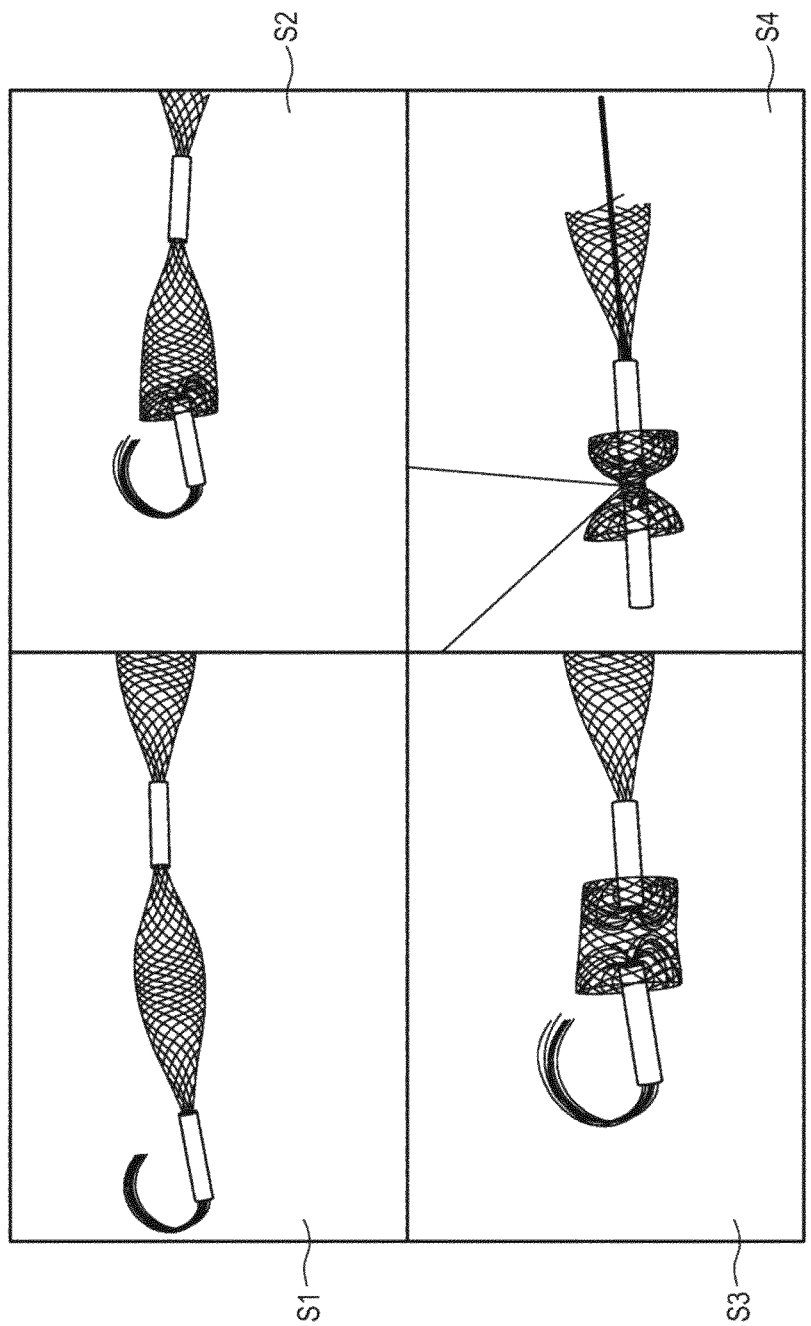
Figure 10A:
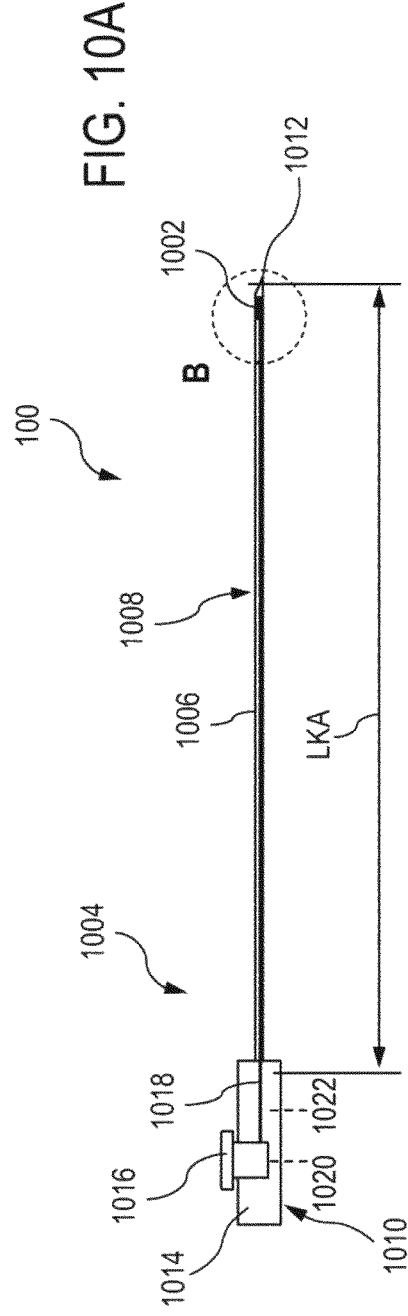
Figure 11:
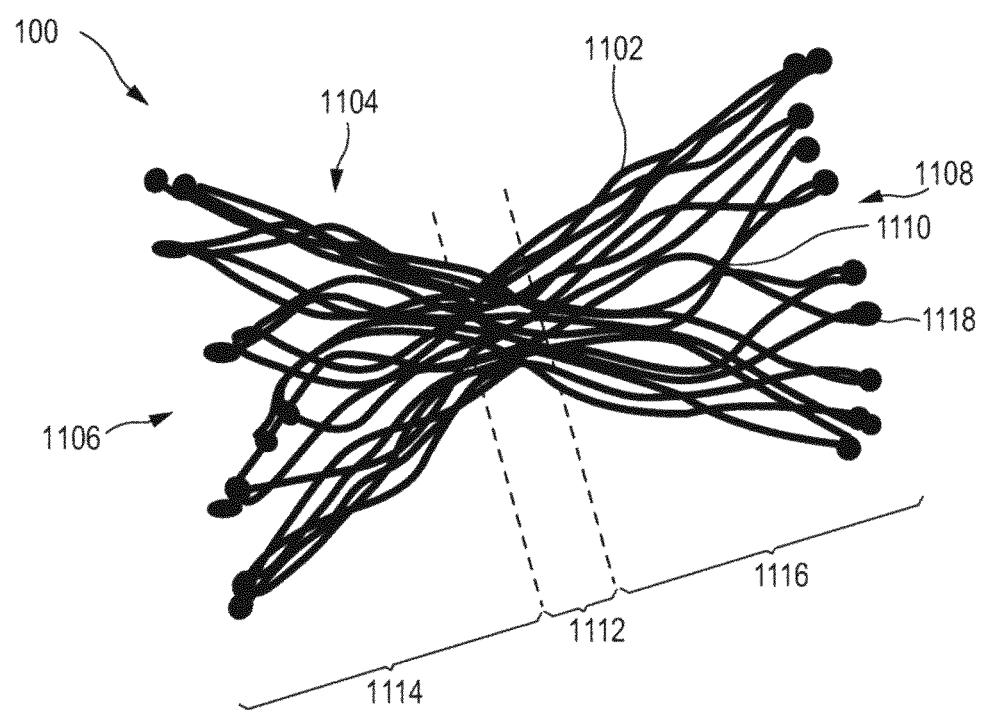
Figure 12:
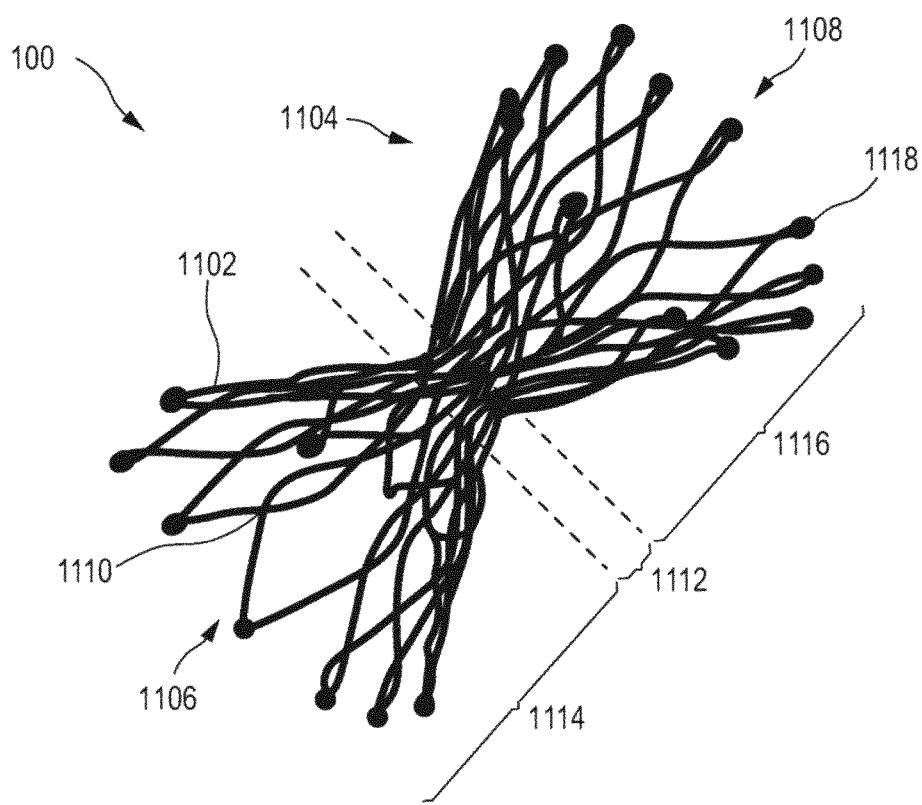
Figure 13:
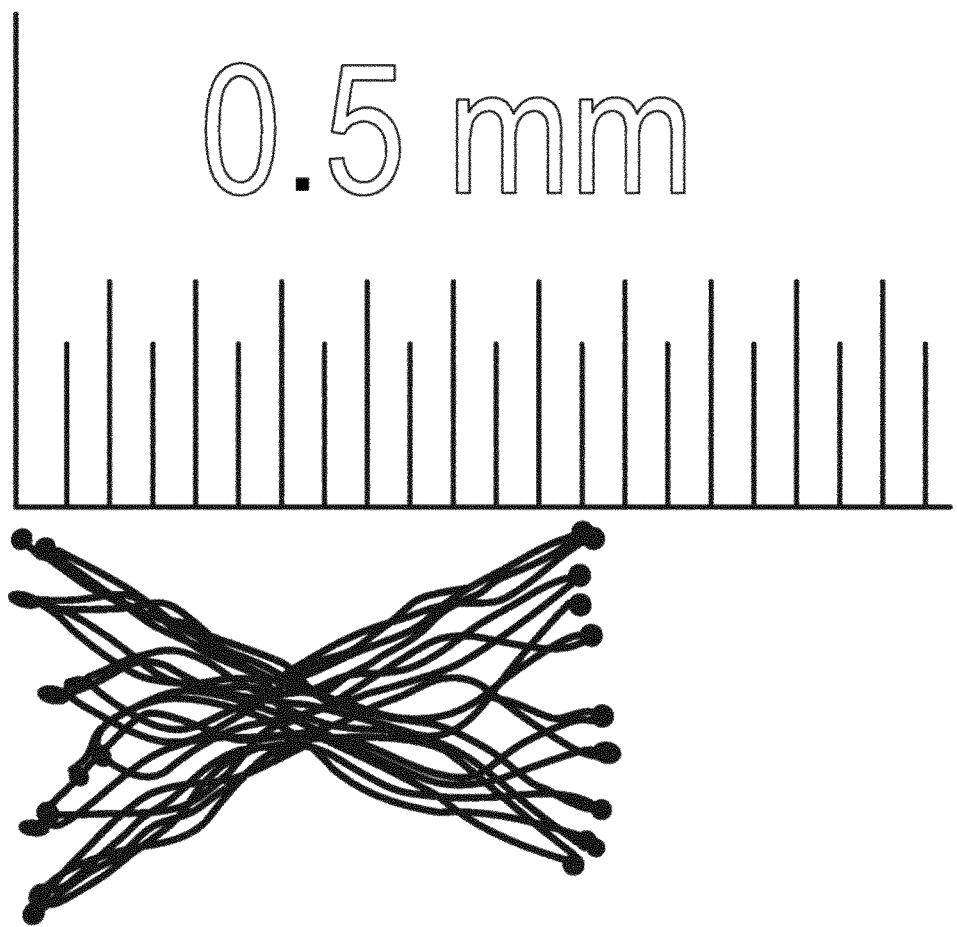
Figure 14:
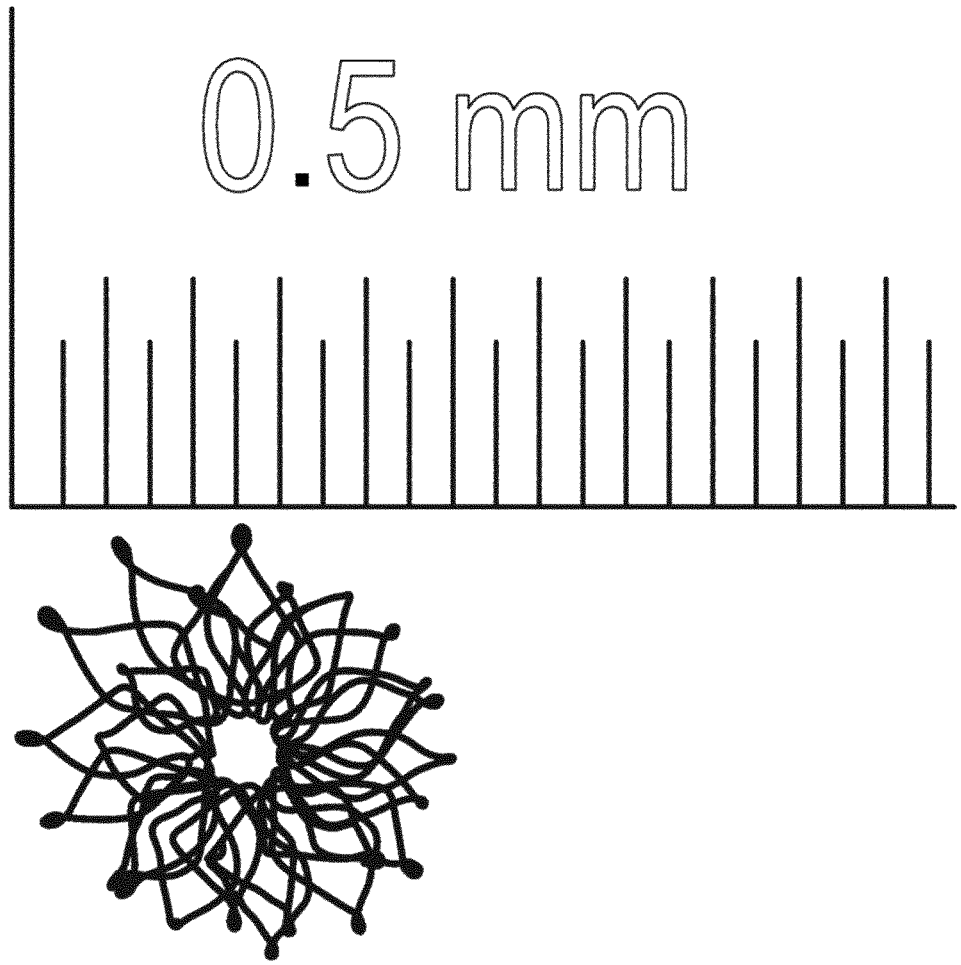
Figure 15:
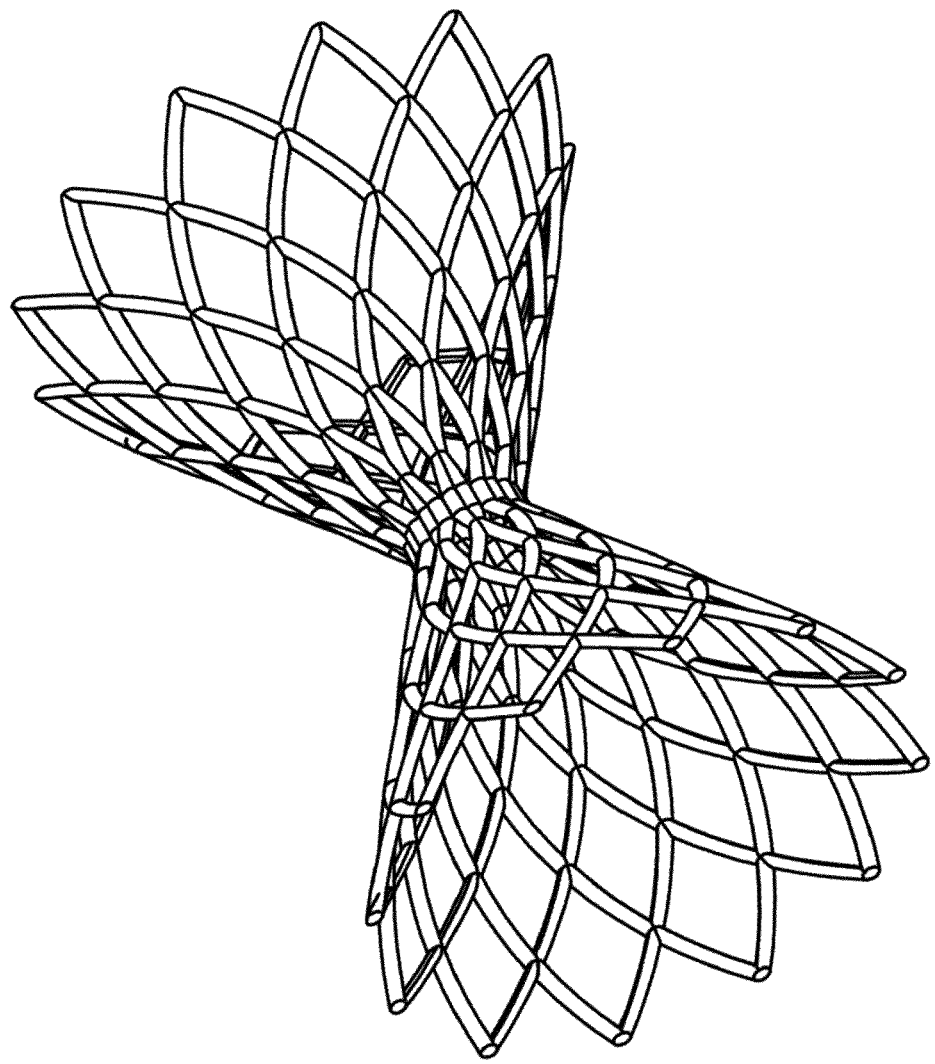
Figure 16:
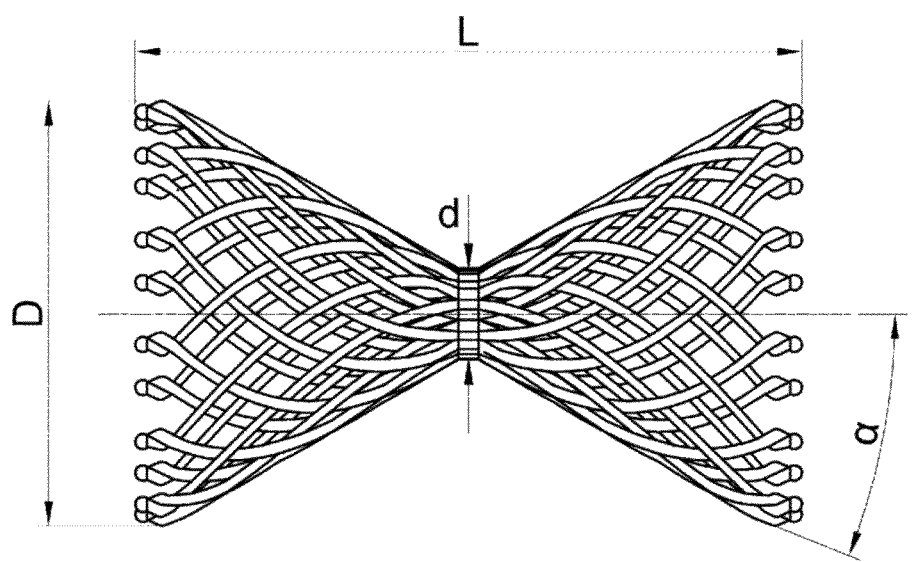
Figure 17:
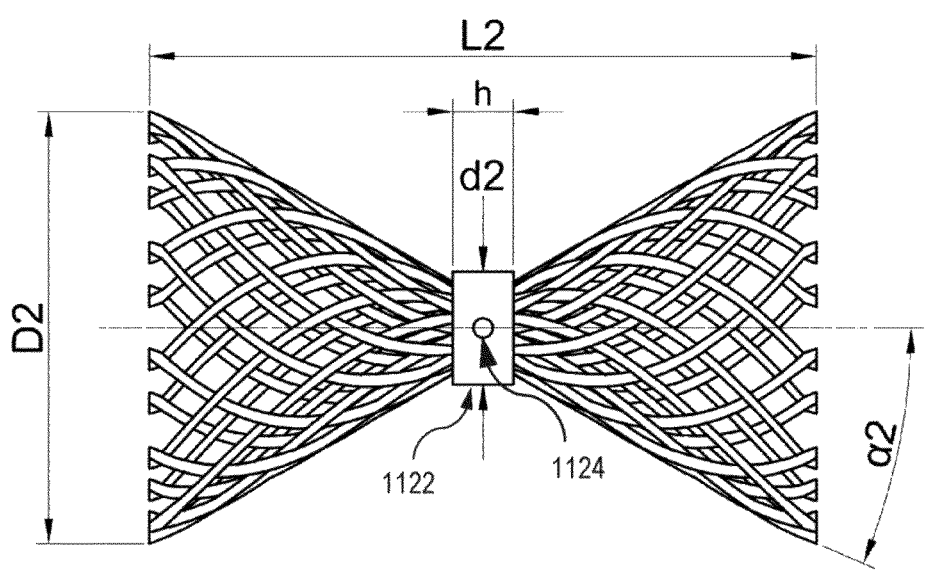
Figure 18:
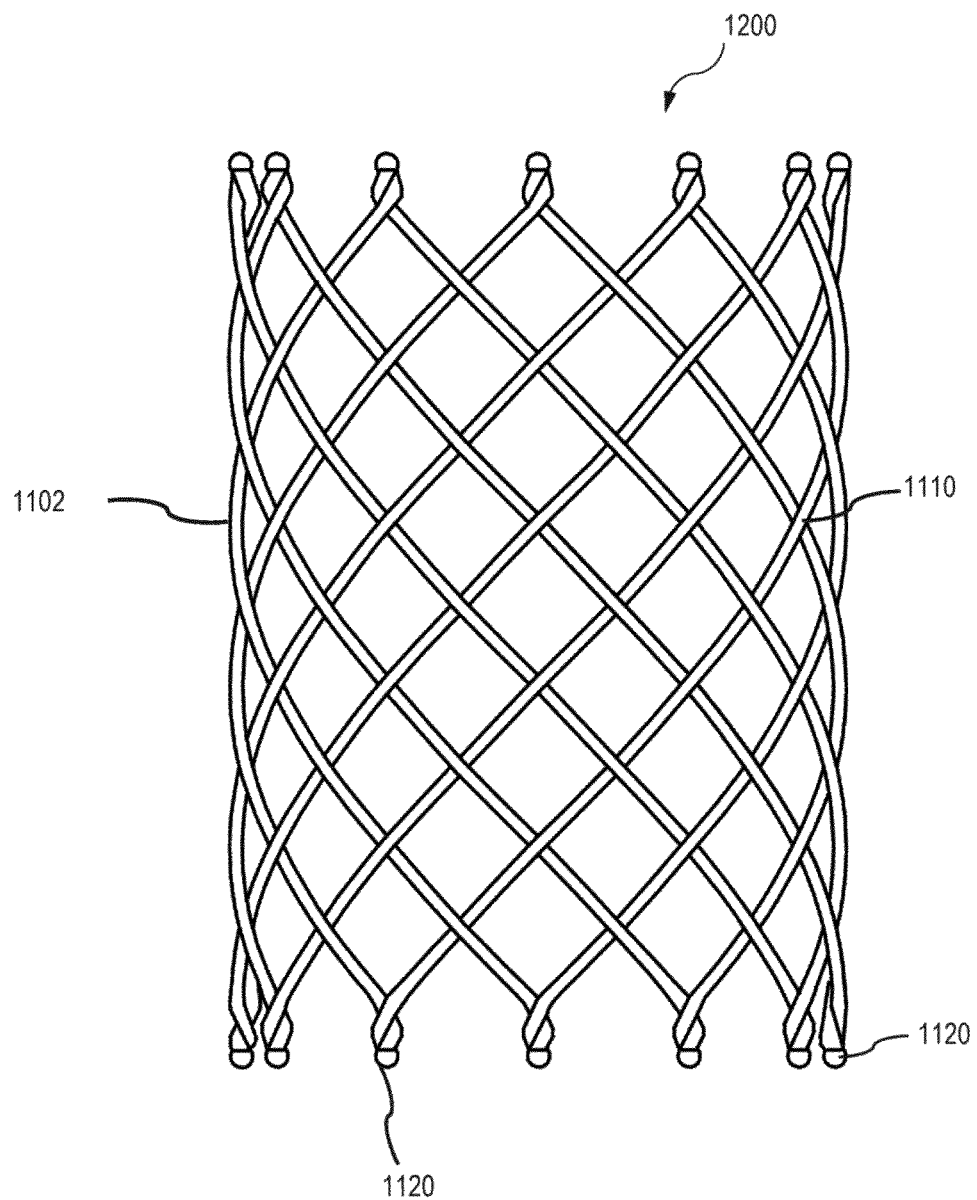
Figure 19:
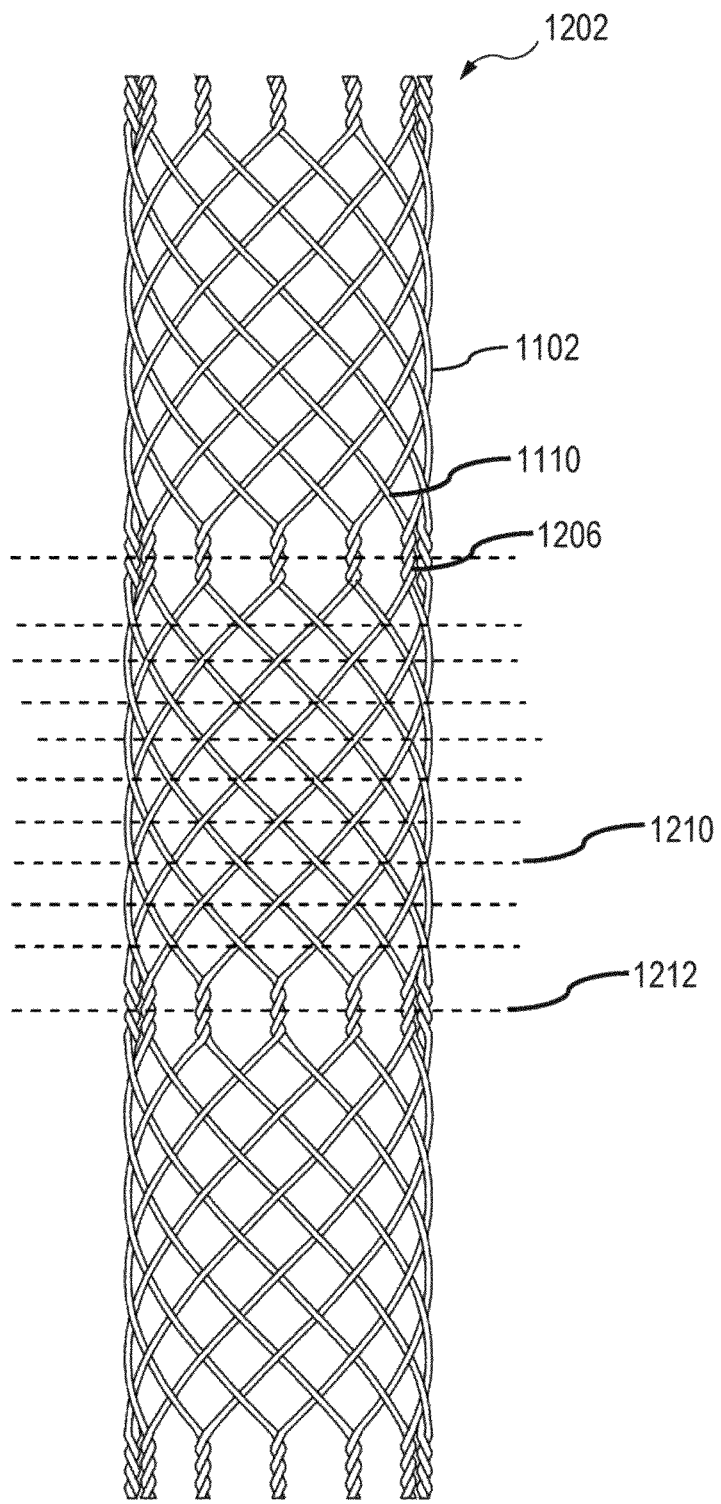
Figure 20:
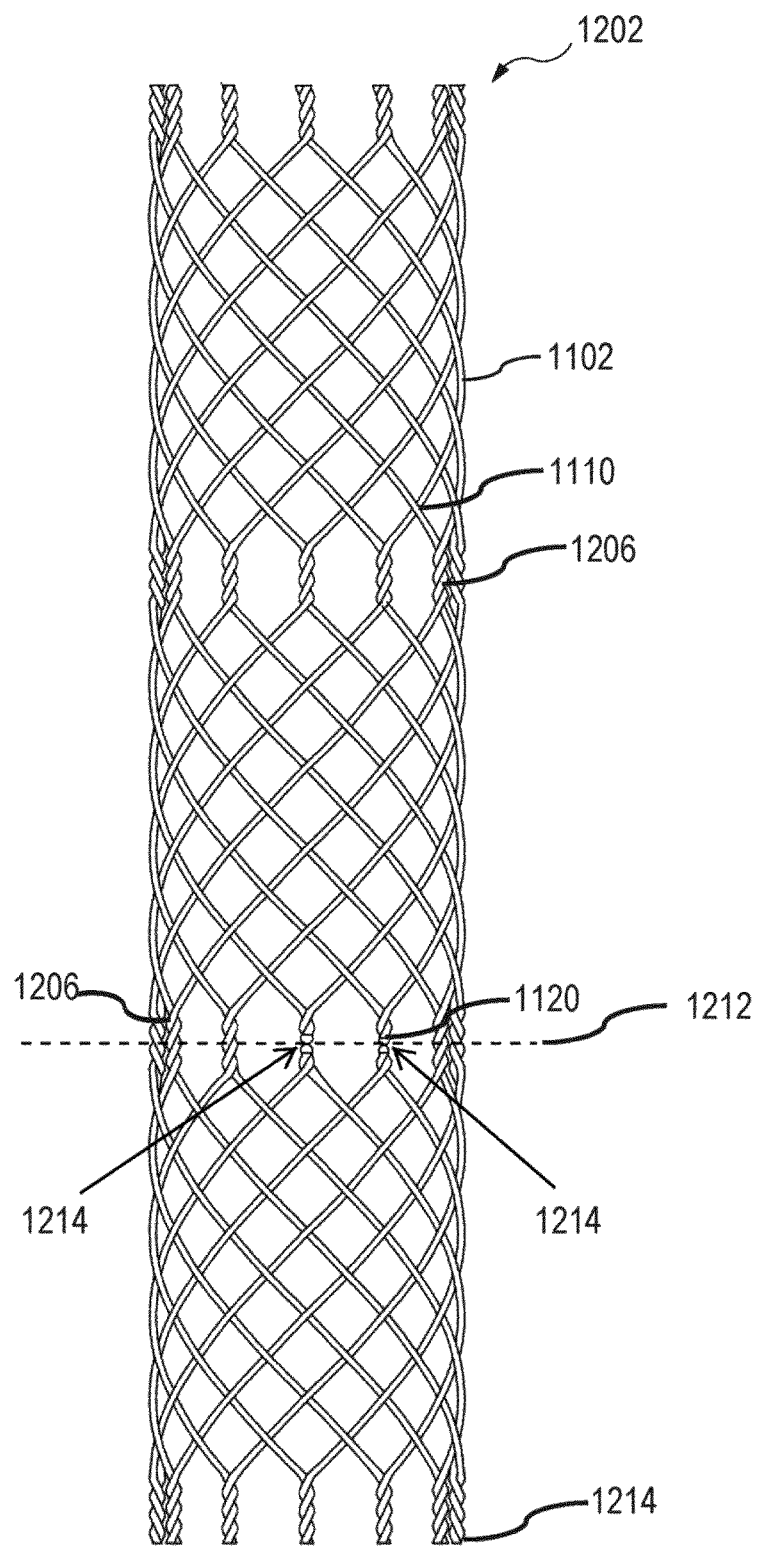
Figure 21:
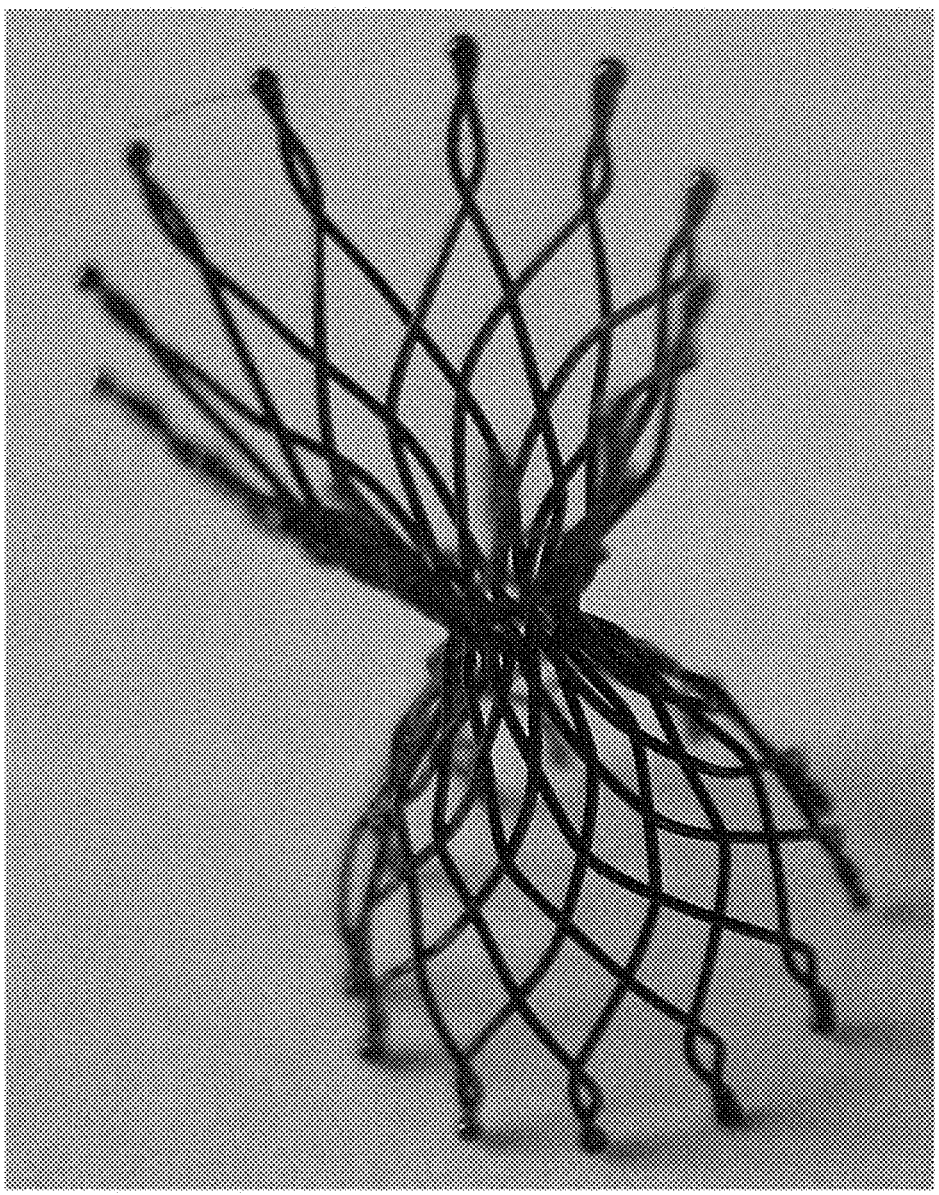
Figure 22:
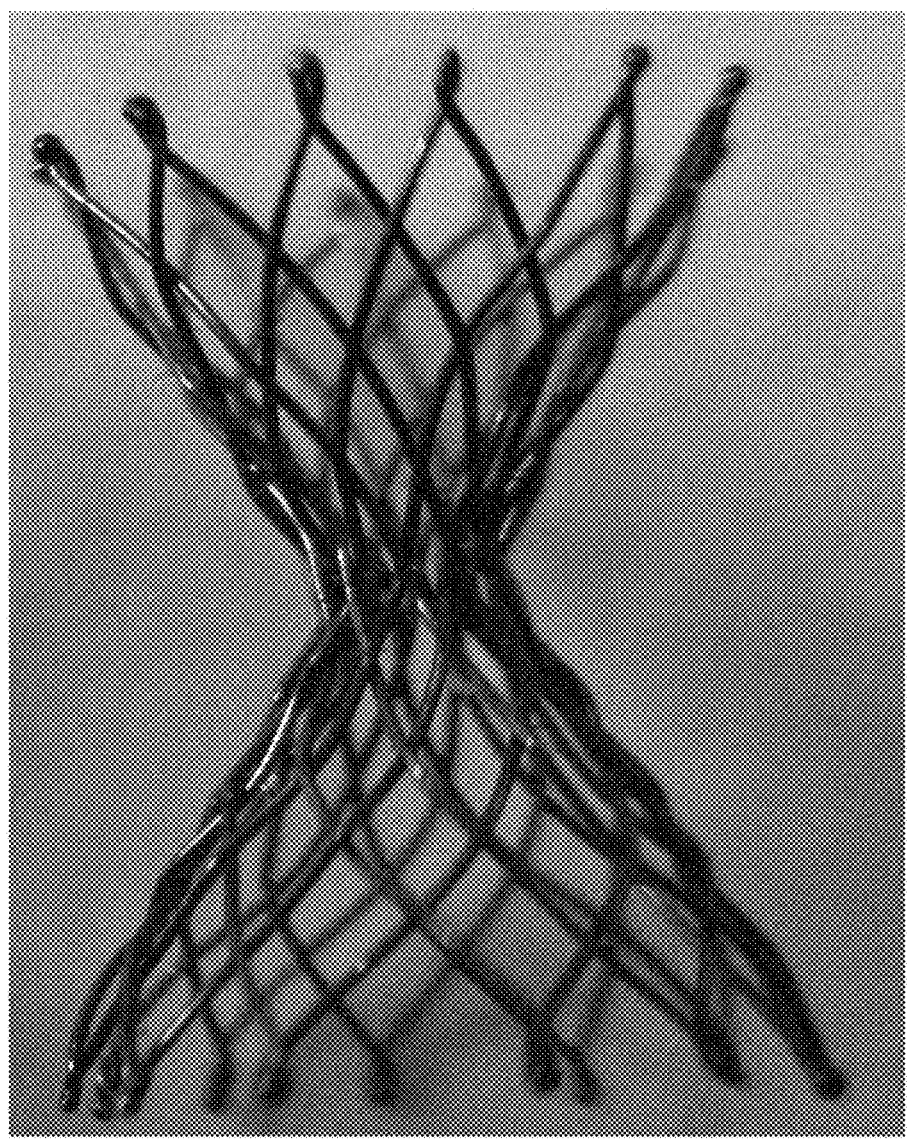
Figure 23:
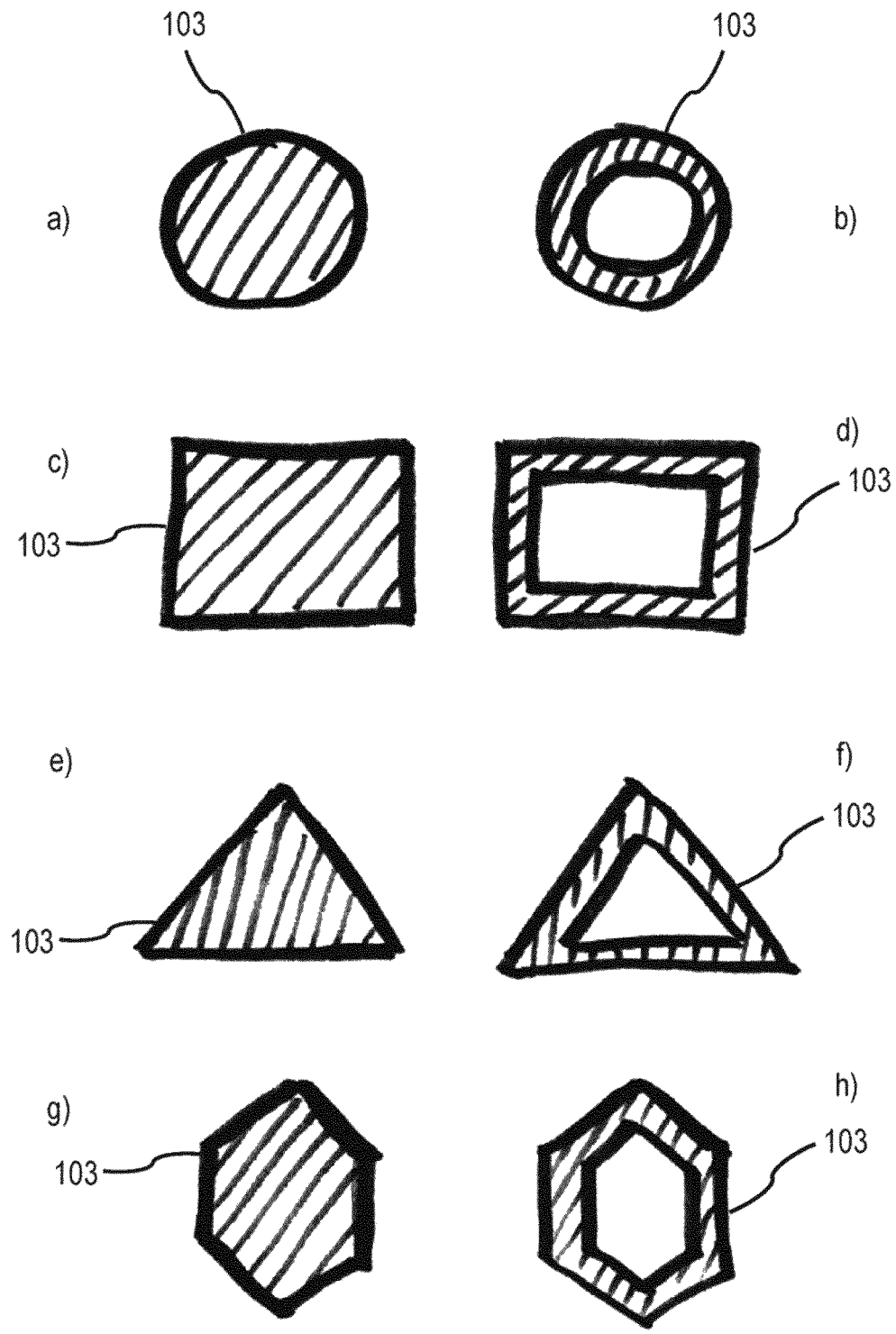
Figure 24:
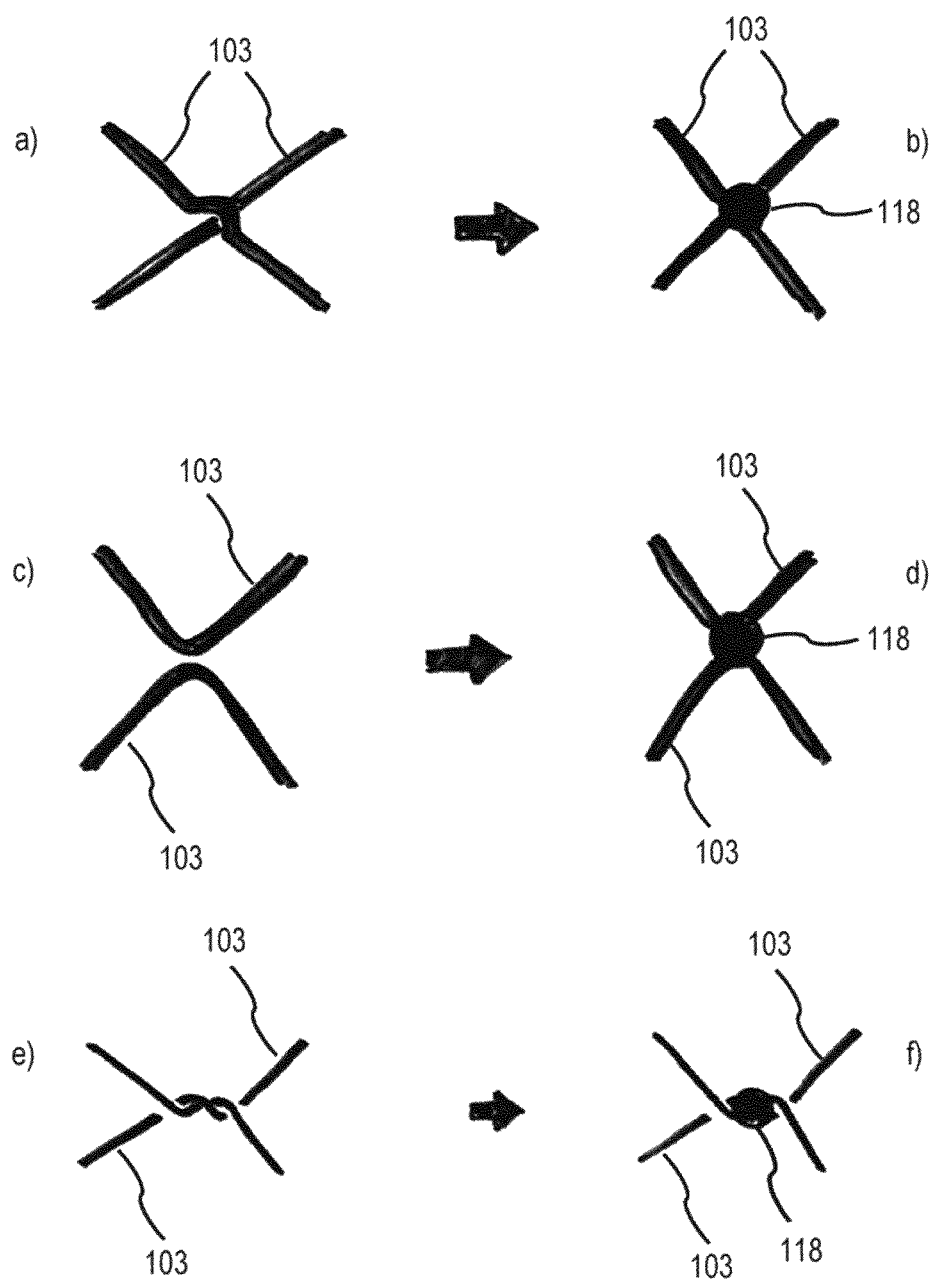
Figure 25:
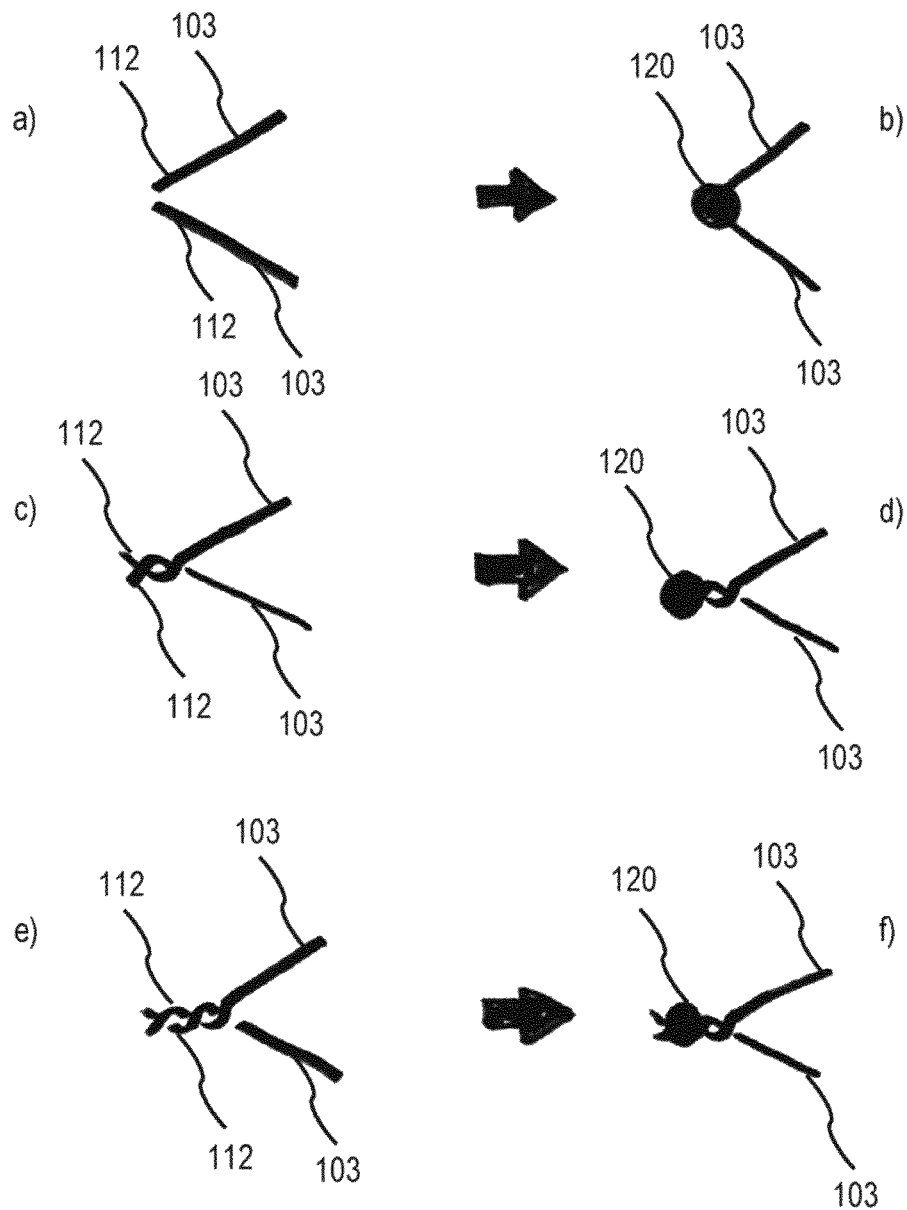
Figure 26:
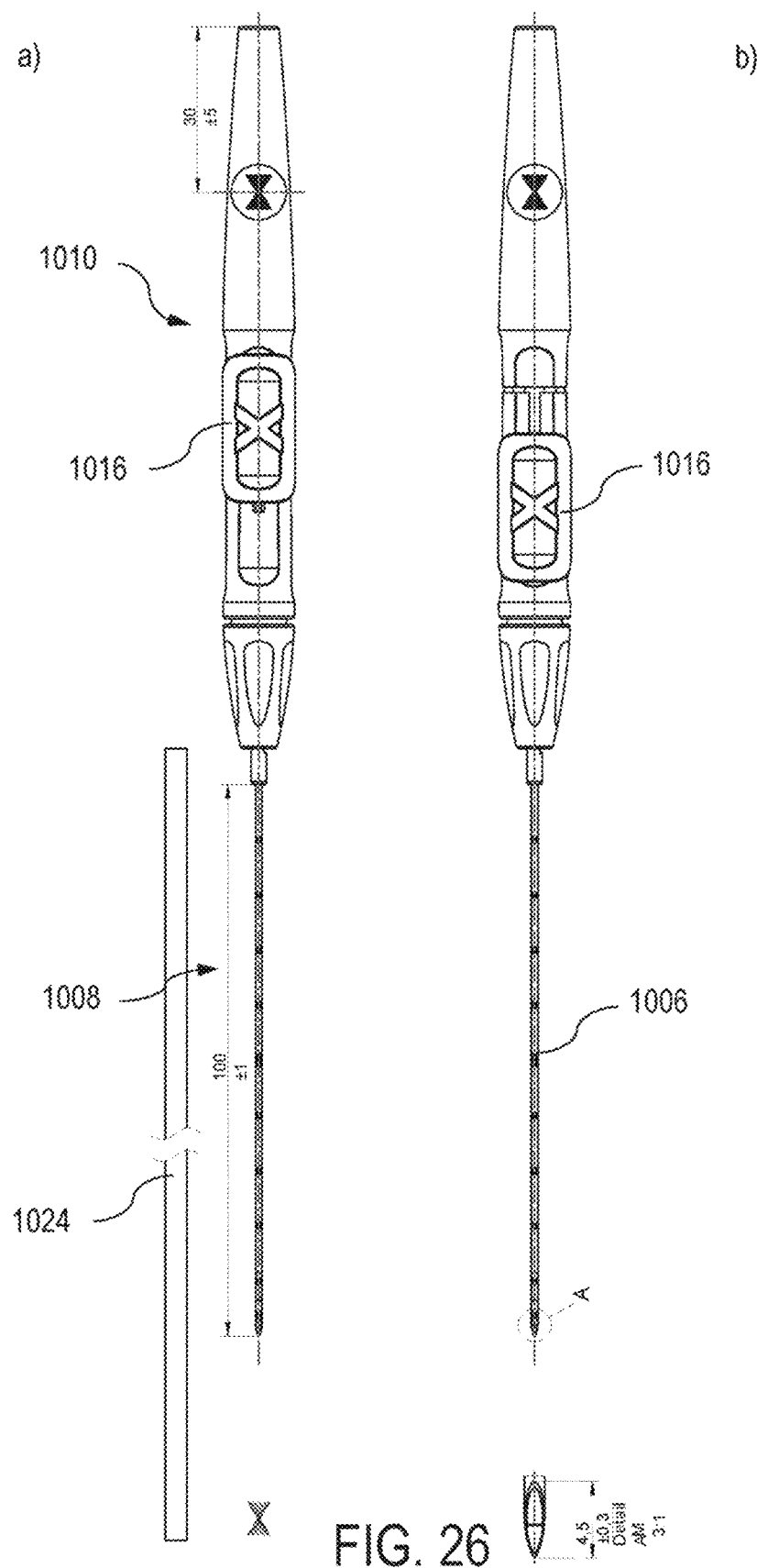
Figure 27:
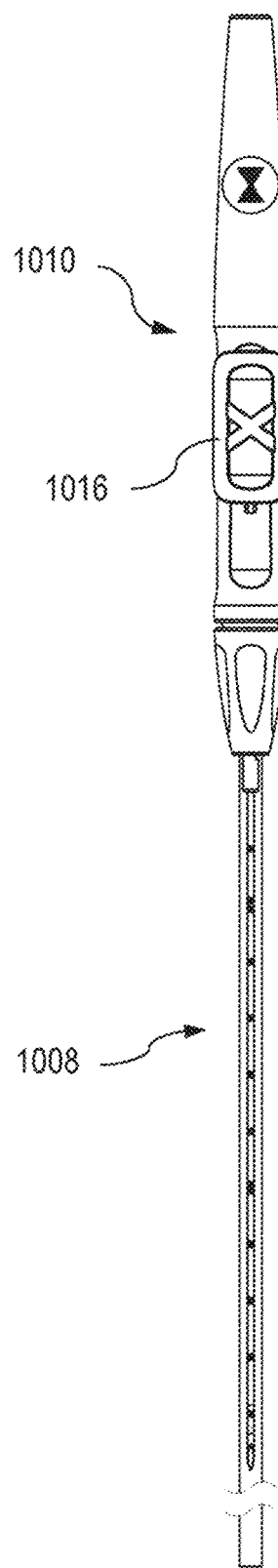
Figure 28:
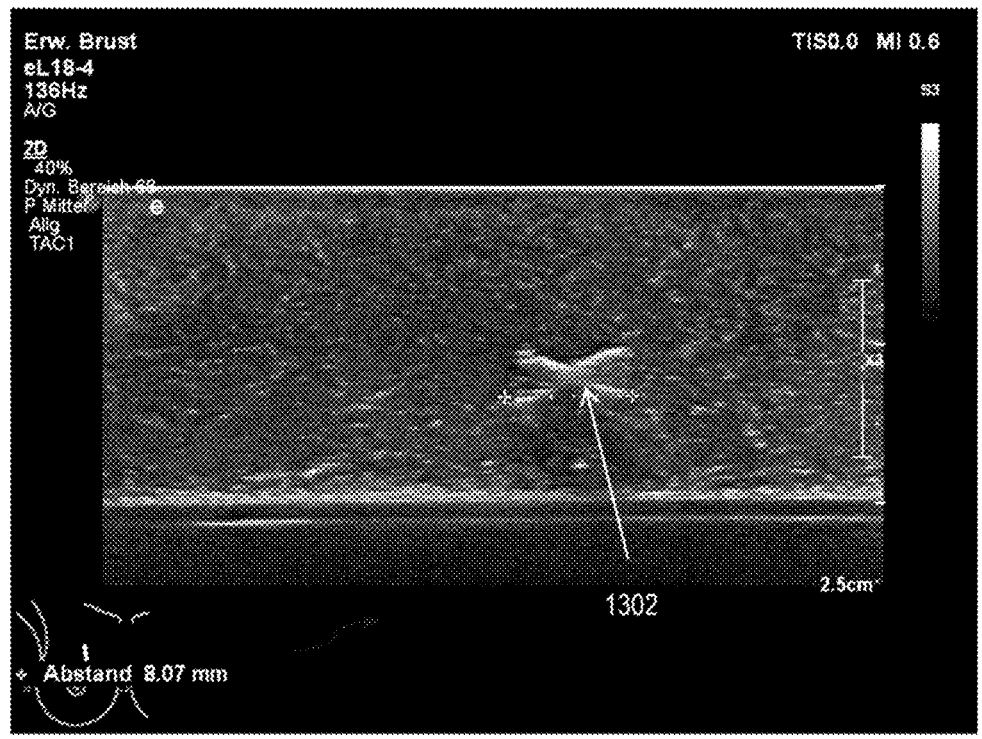
Figure 29:
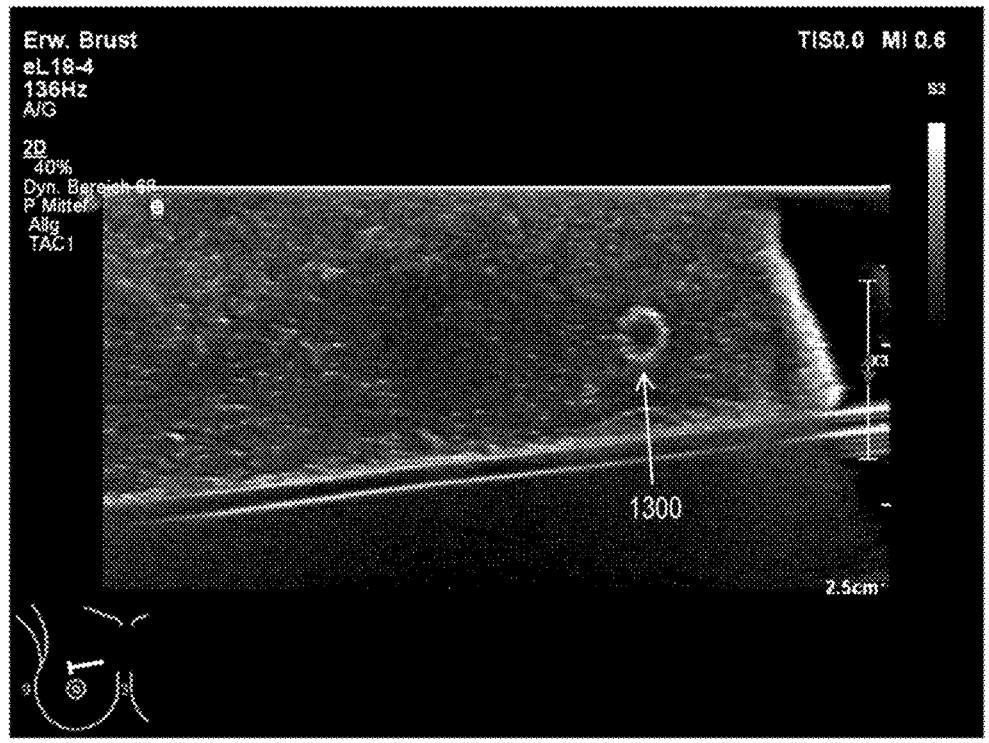

Further advantages, features and details of the invention arise from the following description of the preferred embodiments and the illustrating figures, in which:
  FIG. 1: shows a schematically represented marking body in a side view;
  FIG. 2: shows the marking body shown in FIG. 1 in an end view;
  FIG. 3: shows a schematically represented marking body in a side view;
  FIG. 4: shows the marking body shown in FIG. 3 in an end view;
  FIG. 5: shows a schematically represented marking body in a side view;
  FIG. 6: shows the marking body shown in FIG. 5 in an end view;
  FIG. 7: shows a schematically represented marking body in a side view;
  FIG. 8: shows the marking body shown in FIG. 7 in an end view;
  FIG. 9: illustrates various phases of a production method for producing a marking body;
  FIG. 10A, B, C: schematically show an implantation system having a marking body and an implantation apparatus;
  FIG. 11: shows a marking body with a support structure formed by 24 wires;
  FIG. 12: shows a further view of the marking body shown in FIG. 11, the end side of the marking body being visible here;
  FIG. 13: shows a side view of the marking body from FIGS. 11 and 12 in conjunction with a scale;
  FIG. 14: shows an end view of the marking body from FIGS. 11 and 12 in conjunction with a scale;
  FIG. 15: shows a perspective view of the marking body depicted in FIGS. 3 and 4;
  FIG. 16: shows a marking body produced from a braided wire mesh, similar to the marking body depicted in FIGS. 3, 4 and 15;
  FIG. 17: shows a marking body produced from a braided wire mesh, similar to the marking body depicted in FIG. 16 with an additional central sleeve;
  FIG. 18: shows a braided wire mesh as a section of a braided tube which can be used as an initial product for shaping a marking body as depicted in FIGS. 16 and 17;
  FIG. 19: shows a section of a tube braided from wire, from which three braided wire meshes according to FIG. 18 can be produced by separation;
  FIG. 20: shows the braided wire tube from FIG. 19, in the case of which the wires are separated at two sites by means of a laser;
  FIG. 21: shows a perspective view of the marking body depicted in FIG. 16;

FIG. 22: shows a further side view of the marking body depicted in FIG. 16;

FIGS. 23a to 23h: show different cross-sectional shapes for webs of a marking body according to FIGS. 1 and 2;

FIGS. 24a to 24f: show different variants of how individual webs of the marking body from FIGS. 1 and 2 can be interconnected at crossing points;

FIGS. 25a to 25f: show different variants of how free ends of two webs of a marking body according to FIGS. 1 and 2 can be connected;

FIGS. 26a to 26b: show plan views of an implantation apparatus for a marking body according to FIGS. 1 to 25;

FIG. 27: shows a further view of the implantation apparatus of FIG. 26;

FIG. 28: shows an ultrasound image having an artifact of the marking body, as viewed from the side; and FIG. 29: shows an ultrasound image having an artifact of the marking body in the longitudinal direction.

FIG. 1 shows a side view of a schematically illustrated marking body 100. FIG. 2 shows an end view of the same marking body 100.

The marking body 100 is formed from a laser-cut tube.

The marking body 100 is depicted in the expanded state and has two flared longitudinal sections 102, 104 and one central longitudinal section 106, which is situated between the two longitudinal sections 102, 104.

The two flared longitudinal sections 102, 104 each flare conically starting from the central longitudinal section 106. Accordingly, the external diameter of the flared longitudinal sections 102, 104 increases continuously starting from the central longitudinal section 106. Each flared longitudinal section 102, 104 has a maximum external diameter at the respective longitudinal ends of the marking body 100.

In the two flared longitudinal sections 102, 104, the marking body 100 has a mesh-like support structure with a multiplicity of crossing points 105 formed by webs 103. To bring the marking body 100 into its elastically compressed state, the web-like support structures in the two flared longitudinal sections 102, 104 can be pressed radially together so that the meshes 108 in the respective support structure close in the direction of the longitudinal axis 110 of the marking body. The effective length of the marking body 100 is accordingly longer in the compressed state than in the expanded state. To bring the marking body 100 into an elastically compressed state, a radial force of at least one newton must be exerted on the marking body 100 in the two flared longitudinal sections 102, 104. Consequently, the marking body 100 is designed such that it exerts a radial force of approximately one newton on the surrounding tissue when in a compressed state and expands should the opposing force of the tissue be less than one newton. In embodiments not shown here, the marking body comprises webs with a web thickness that differs from the web thickness of the webs 103 such that a comparatively greater radial force, for example at least 1.5 newtons, must be exerted on the marking body in order to elastically compress the latter.

In the central longitudinal section 106, the tube has not been cut by laser and accordingly has a closed, sleeve-shaped support structure.

The marking body 100 is rotationally symmetric in relation to its longitudinal axis 110. In the expanded state, the marking body 100 has a length L1 of 7 mm. The tube from which the marking body 100 is formed has an internal diameter of 0.458 mm, an external diameter of 0.762 mm and a wall thickness of 0.152 mm. In the central longitudinal section 106, the marking body 100 continues to have the original dimensions, even after said marking body was cut by laser in the adjacent longitudinal sections 102, 104. By way of example, the marking body 100 may be formed from a titanium alloy, in particular nitinol.

In embodiments not shown here, marking bodies are formed by a tube that has different dimensions but is otherwise laser cut in such a way that a marking body with a central longitudinal section and two flared longitudinal sections emanating therefrom, as described in relation to FIG. 1, is formed. By way of example, such tubes can have an external diameter between 0.6 mm and 0.08 mm, an internal diameter of between 0.3 mm and 0.5 mm, and a wall thickness between 0.1 mm and 0.5 mm.

In the flared longitudinal sections 102, 104, the maximum external diameter A1 of the marking body 100 is 3.5 mm and can be between 3 mm and 4 mm, for example, in alternative embodiments. In the central longitudinal section 106, the internal diameter I1 is 0.458 mm.

FIG. 3 shows a side view of a schematically illustrated marking body 100 in the expanded state. FIG. 4 shows an end view of the marking body 100.

The marking body 100 comprises a support structure formed by a braided wire mesh 301. The wires 308 extend from one longitudinal end of the marking body 100 to its other longitudinal end. On the path from one longitudinal end to the other longitudinal end, the wires 308 cross other wires 308 and are braided in particular, that is to say each wire 308 is alternately guided first below and then above another wire 308 of the braided wire mesh 301. As a result, a mesh-like support structure with a multiplicity of crossing points 310 arises. In relation to the depicted representation in FIGS. 3 and 4, it should be observed that these crossing points 310, at which two wires 308 are in each case in contact, welded to one another or twisted around one another, are not reproduced with accurate detail. The crossing points 310 at which two wires 308 are in contact in each case may for example be designed like in the braided wire mesh, likewise formed by crossing wires, of the marking body described and depicted in relation to FIGS. 11 and 12.

In contrast to the wires 1102 of the marking body 100 described in relation to FIGS. 11 and 12, the wires 308 are welded to one another, that is to say cohesively interconnected, at the crossing points 310. As an alternative or in addition to welding, the wires 380 can also be twisted around one another at the crossing points 310. Especially the free ends 312 of the wires 308 located at the respective longitudinal ends 314, 316 of the marking body 100 are each welded to one or more free ends of further wires 308.

Like the marking body described in relation to FIGS. 1 and 2 as well, the marking body 100 has flared longitudinal sections 302, 304 and a central longitudinal section 306 arranged between these flared longitudinal sections 302, 304. The external diameters of the two flared longitudinal sections 302, 304 increase continuously in the direction of the longitudinal ends of the marking body 100 starting from the central longitudinal section 306. The external diameter of the marking body 100 in the two longitudinal sections 302, 304 accordingly is at a maximum at the respective longitudinal ends.

The braided wire mesh 301 comprises 24 wires which consist of nitinol and have a diameter of 0.12 mm. In alternative embodiments of the marking body not shown here, the braided wire mesh comprises between 10 and 40 wires which are welded to one another and/or twisted around one another at their crossing points. In the embodiments not shown here, the marking bodies comprise braided wire meshes which are formed by wires with diameters ranging between 0.10 mm and 0.14 mm. Wires that consist of titanium alloys other than nitinol can also be used.

The marking body 100 has a length L2 of 6 mm; in alternative embodiments not shown here, this length may also range between 5 mm and 7 mm, however.

The central longitudinal section 306 of the marking body 100 is provided with a sleeve, in particular a nitinol sleeve 318, which compresses the braided wire mesh 301 to a defined external diameter within the central longitudinal section 306.

The maximum external diameter A2 of the marking body in the two flared longitudinal sections 302, 304 is 4 mm and can be between 3.5 mm and 4.5 mm in alternative embodiments not shown here.

To bring the marking body 100 into an elastically compressed state from the expanded state, a radial force of at least one newton must be exerted on the marking body 100. Consequently, the marking body 100 is designed such that it exerts a radial force of approximately one newton on the surrounding tissue when in a compressed state and expands should the opposing force of the tissue be less than one newton.

In alternative embodiments not shown here, the self-expanding marking body 100 may have more wires and accordingly more crossing points, and so said marking body is comparatively stiffer. Accordingly, a comparatively greater radial force then is required to bring the marking body into an elastically compressed state. Likewise, the number of wires can be lower in alternative embodiments not shown here, in order to realize a marking body which already transitions into its elastically compressed state when a radial force of less than one newton is exerted.

The expanded marking body 100 shown in a side view in FIG. 5 has a helical support structure. FIG. 6 shows the marking body 100 in an end view.

A central longitudinal section 502 comprises one turn but may also comprise a plurality of turns, preferably with a constant external diameter, in alternative embodiments not shown here. Each side of the central longitudinal section 502 is adjoined along the longitudinal axis 504 of the marking body 100 by a respective flared longitudinal section 506, 508, the external diameter of which increases continuously starting from the central longitudinal section 502. That is to say, starting from the central longitudinal section, the external diameter of the marking body 100 increases from turn to turn. In the expanded state of the marking body 100 shown here, the spiral support structure has an angle W1 that is 30°. The marking body 100 can be brought into an elastically compressed state by virtue of the helical support structure being pulled apart, as a result of which the angle is reduced. To bring the marking body 100 into an elastically compressed state, a radial force of at least one newton must be exerted thereon. Consequently, the marking body 100 is designed such that it exerts a radial force of approximately one newton on the surrounding tissue when in a compressed state and expands should the opposing force of the tissue be less than one newton.

The marking body 100 has a length L3 of 6 mm; in alternative embodiments not shown here, this length may also range between 5 mm and 7 mm, however.

The maximum external diameter A3 of the marking body 100 in the flared longitudinal sections 506, 508 is 5 mm and can also be between 4 mm and 6 mm, but in particular also be less than 4 mm, in alternative embodiments not shown here.

FIG. 7 shows a side view of an expanded marking body 100. FIG. 8 shows the marking body 100 in an end view.

The marking body 100 has two flared longitudinal sections 702, 704 and one central longitudinal section 706, which is situated between the two flared longitudinal sections 702, 704. Like the marking body described in relation to FIGS. 1 and 2 as well, the marking body 100 is also formed from a laser-cut tube. In particular, the marking body 100 is laser-cut in the two flared longitudinal sections 702, 704 and not laser-cut in the central longitudinal section 706. Accordingly, the marking body 100 in the expanded state has a lattice-like support structure in the two flared longitudinal sections 702, 704, whereas the support structure is closed and sleeve-like in the central longitudinal section 706.

In contrast to the marking body described in relation to FIGS. 1 and 2, the marking body 100 does not widen continuously to the longitudinal ends of the marking body 100 in the two flared longitudinal sections 702, 704 but only widens from the central longitudinal section up to approximately the center of the respective flared longitudinal section 702, 704. Then, the external diameter of the marking body in the respective flared longitudinal section 702, 704 is substantially constant in the direction of the respective longitudinal end of the marking body 100.

In alternative embodiments not shown here, the external diameter of the marking body is not constant between approximately the center of the respective flared longitudinal section and the respective longitudinal end of the marking body, but reduces such that the shape of the respective flared longitudinal section is at least approximately spherical or ellipsoid.

The marking body 100 has a length L4 of 7 mm; in alternative embodiments not shown here, this length ranges between 4 mm and 10 mm, however. In the central longitudinal section 706, the dimensions of the marking body 100 correspond to the original dimensions of the tube from which the marking body 100 has been formed. In the central longitudinal section 706, the marking body 100 has an external diameter of 0.762 mm, an internal diameter of 0.458 mm and a wall thickness of 0.152 mm. In alternative embodiments of the marking body not shown here, the latter has an external diameter ranging between 0.6 mm and 0.08 mm, an internal diameter ranging between 0.3 mm and 0.5 mm, and a wall thickness ranging between 0.1 mm and 0.5 mm in the central longitudinal section.

In the two flared longitudinal sections 702, 704, the maximum external diameter A4 of the marking body 100 is 3.5 mm, but can also be between 3 mm and 4 mm in alternative embodiments not shown here. The internal diameter I2 of the marking body 100 is 0.458 mm in the central longitudinal section 706.

To elastically compress the marking body 100, a radial force of at least one newton must be exerted thereon. If the marking body 100 has been implanted into the tissue, the latter independently transitions into its expanded state and maintains the latter if the radial force exerted by the tissue on the marking body 100 is less than one newton. Consequently, the marking body 100 is designed such that it exerts a radial force of approximately one newton on the surrounding tissue when in a compressed state and expands should the opposing force of the tissue be less than one newton.

FIG. 9 illustrates various phases of a production method for producing a marking body which has a support structure formed by a braided wire mesh. By way of example, a marking body as described in relation to FIGS. 3 and 4 can be produced in accordance with the method described below.

Initially, a tubular braided wire mesh is provided in a step S1, the latter for example being able to comprise between 20 and 40 individual wires which are braided with one another and, as a consequence, cross at crossing points. The wires are preferably cohesively interconnected or twisted around one another at the crossing points.

Sleeves are pushed onto the tubular braided wire mesh such that a section of the braided wire mesh is exposed between the two sleeves and the two sleeves are aligned coaxially with respect to one another.

Subsequently, the sleeves are moved toward one another in the longitudinal direction of the tubular braided wire mesh, to be precise without there being relative movement between the respective sleeve and the braided wire mesh enclosed thereby. As a result, the braided wire mesh exposed between the sleeves is compressed in the longitudinal direction and flares in the radial direction (step S2).

The two sleeves can be moved so far toward one another that the braided wire mesh is partly invaginated (step S3).

Moreover, the braided wire mesh is constricted in a central longitudinal section in the center of the exposed braided wire mesh, for example by virtue of a nitinol wire being wound about the braided wire mesh (step S4). This can be carried out before or after the flaring and optional invagination.

Then, the braided wire mesh can be cut perpendicular to the longitudinal direction of said braided wire mesh on both sides of the central longitudinal section and the part of the braided wire mesh cut off, for example the invaginated part, can be removed. Preferably, cutting is implemented at crossing points of the braided wire mesh already present, which are located on a plane that extends transversely to the longitudinal direction of the braided wire mesh. As a result, the longitudinal ends of the wires are interconnected pairwise.

Should cutting not be implemented at crossing points already present and should free ends of the braided wire mesh thus arise, these free ends can be twisted around one another and/or welded to one another.

FIG. 10A shows an implantation system 1000 having a marking body 100 of an implantation apparatus 1004. In this case, the marking body 100 in the pre-loaded state, that is to say with a compressed support structure, is situated within the cannula 1006 of the implantation apparatus 1004. This state of the implantation system 1000 represents a typical delivery state, in which the implantation system 1000 is made available in a ready-to-use state for the user, for example a surgeon.

The implantation part 1008 of the implantation apparatus 1004 substantially consists of a cannula 1006 which has a cannula tip 1012 at its distal end, that is to say the end distant from the handle 1010. As a rule, the marking body 100 in the pre-loaded state is situated in this region within the cannula 1006, just inside the outlet at the cannula tip 1012. In particular, the cannula 1006 can be formed from a suitable metal.

The cannula 1006 has a length LKA which for example can adopt a value ranging between 25 mm and 200 mm, preferably between 50 mm and 150 mm. The length LKA of the cannula 1006 has an influence on the range of the implantation apparatus 1004 in respect of the reachability of tissue sites in the body of a patient to be labeled. The longer cannulas are used when adjustment aids are used, for example for stereotaxis.

The implantation apparatus 1004 comprises a handle 1010 and an implantation part 1008. The handle 1010 comprises a handle housing 1014 and a sliding element 1016, which for example can be produced from a suitable plastic.

The sliding element 1016 is connected to the handle housing 1014 but is movable relative to the handle housing 1014 in the axial direction of the cannula 1006. Consequently, the sliding element 1016 can be moved along a straight, guided sliding path between a pre-loaded position 1020 and a driving-out position 1020.

This movement is transferred from the sliding element 1016 via a driving-out element 1018, which is connected to the sliding element 1016 and which can be formed for example by way of a wire or a sufficiently stable plastics fiber, to the distal region distant from the handle 1010. Consequently, when the sliding element 1016 is moved to the driving-out position 1020, the pre-loaded marking body 100 can be driven out of the cannula 1006 to the tissue site to be labeled at the distal end of the cannula 1006 by way of a sliding movement of the driving-out element 1018.

This is achieved by virtue of the driving-out element 1018 that is aligned coaxially with respect to the cannula 1006 being moved in the direction of the cannula tip 1012 and hence pushing the pre-loaded marking body 100 out of the cannula 1006 past the cannula tip 1012.

Figure 10C:
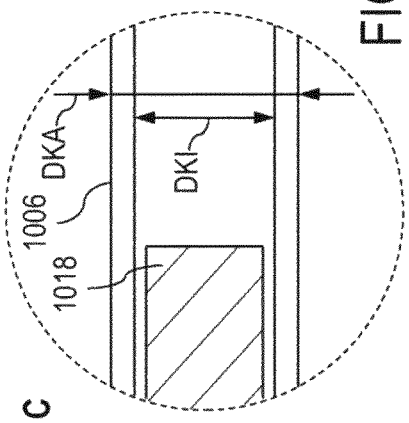
Figure 10B:
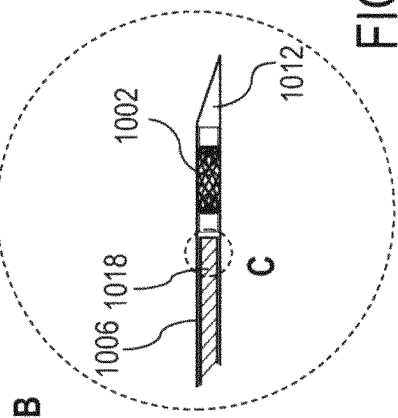

FIG. 10B depicts detail B of FIG. 10A, specifically a detailed view in the region of the cannula tip 1012 of the implantation system 1000 in the pre-loaded state. In this view, the marking body 100, in particular, can be seen in the compressed state, said marking body being situated within the cannula 1006 behind the driving-out element 1018 and in front of the cannula tip 1012 from the view of the handle 1010. On account of its prestress, the marking body maintains the position in the cannula 1006 and cannot fall out on its own. On account of this property, additional features or apparatuses for fixing the marking body 100 within the cannula 1006 can be dispensed with.

FIG. 10C shows a further detailed, schematic view of the cannula 1006, this time as detail C from FIG. 10B. In this view, the distal end of the driving-out element 1018 is visible within the cannula 1006. Furthermore, the external diameter DKA and the internal diameter DKI of the cannula 1006 are labeled.

Together with the cannula length LKA, the internal diameter DKI of the cannula 1006 describes the size of the internal cavity formed by the cannula 1006 and at the same time restricts the maximum possible diameter DM of the marking body 100 in the compressed state or, optionally, the maximum possible diameter DK of the at least one clamp 105, in order to ensure an ability of the marking body 100 to pass through or move in the cannula 1006 during preloading and driving out. An internal diameter DKI of less than 1.1 mm, particularly preferably of 1.0 mm was found to be preferable.

The external diameter DKA of the cannula 1006 describes the diameter of the external cannula wall. Under the assumption of a constant cannula wall thickness that is as small as possible, the internal diameter DKI of the cannula 1006 simultaneously increases with increasing external diameter BKA, and hence there also is an increase in the maximum possible external diameter of a marking body 100 to be implanted. However, at the same time, an increasing external diameter DKA leads to a greater degree of invasiveness or injury to skin and tissue when carrying out the implantation.

A sufficiently small external diameter DKA ensures the option of a percutaneous implantation of the marking body 100 without having to resort to a stab incision of the skin at the entry site of the cannula 1006 or anesthetization of the relevant tissue. An external diameter DKA of between 1 mm and 1.5 mm, particularly preferably of 1.2 mm was found to be preferable.

FIG. 11 shows a side view of an expanded marking body 100. FIG. 12 shows the marking body 100 in a further view, in which one of the end sides of the marking body 100 is visible.

The marking body 100 has a support structure formed by twenty-four individual, preformed wires 1102. The support structure is formed as a braided wire mesh 1104. The braided wire mesh 1104 is formed of crossing wires 1102, in a manner corresponding to the braided wire mesh 301 of the marking body 100 described in relation to FIGS. 3 and 4. The wires of the braided wire meshes 1104 and 301 can be already preformed, elastic wires.

The wires 1102 run from one longitudinal end 1106 of the marking body 100 to the opposite longitudinal and 1108 of the marking body 100 in a helical fashion about the longitudinal axis of the marking body 100. On the path from one longitudinal end 1106 of the marking body to the other longitudinal end 1108, the wires 1102 are woven with one another, guided multiple times below and above other wires of the support structure, in such a way that they form the braided wire mesh 1104. Crossing points 1110 arise at the sites of the braided wire mesh 1104 at which wires 1102 are guided below or above other wires 1102. The wires 1102 of the braided wire mesh 1104 are not cohesively interconnected at the crossing points 1110 but merely contact one another. In alternative exemplary embodiments not shown here, the wires at the crossing points can be welded to one another, as is the case for example in the marking body described in relation to FIGS. 3 and 4.

The wires 1102 are guided diagonally from one longitudinal end 1106 of the marking body 100 to the other longitudinal end 1108 in such a way that the marking body 100 is constricted in the central longitudinal section 1112.

Starting from the central longitudinal section 1112, the external diameter of the marking body 100 increases continuously on both sides such that the marking body 100 has two conical, flared longitudinal sections 1114, 1116. The external diameter of the marking body 100 in the flared longitudinal sections 1114, 1116 in each case has a maximum at both longitudinal ends 1106, 1108 of the marking body 100.

The angle at which the marking body 100 flares in the flared longitudinal sections 1114, 1116 in the expanded state may for example be 30° and in particular be between 25° and 35° from the central axis. The wires 1104 are formed from nitinol.

At the free ends 1118 of the wires 1102 located at the longitudinal ends 1106, 1108 of the marking body 100, two respective adjacent wires 1102 are twisted around or welded to one another. Weld beads 1120 with a weld bead diameter Ds that is greater than a diameter difference between the internal diameter DKI of the cannula and the external diameter DA of the driving-out element 1018 arise from welding. This prevents the marking body, in particular a weld bead of the marking body, from jamming between the distal end section of the driving-out element 1018 and the inner wall of the cannula. To this end, the distal end of the driving-out element 1018 is preferably also formed with a sharp edge, since round or chamfered edges may bring about a jamming of the marking body such that the marking body cannot be implanted.

The marking body 100 is designed in such a way that a radial force of at least one newton must be exerted on the marking body 100 in order to compress the latter to a diameter of less than 1.5 mm.

The marking body 100 can have a sleeve, for example a nitinol sleeve 1122, which, like in the case of the marking body 100 described with reference to FIGS. 3 and 4, is arranged in the central longitudinal section 1112. A corresponding marking body 100' is depicted in FIG. 17.

The dimensions of the marking body 100 or 100' arise from FIGS. 13, 14, 16 and 17, which show the marking body 100, in its expanded state, in conjunction with a scale. In its expanded state, the marking body has a length of approximately 6 mm to 7 mm (see FIG. 13) and a maximum external diameter of approximately 5 mm (see FIG. 14).

FIG. 15 is an idealized, perspective representation of the marking body 100. The representation in FIG. 15 shows the basic structure but is idealized in respect of the representation of the crossing points and the free, interconnected longitudinal ends 1118 of the wires 1102.

As may be gathered from FIG. 16, the marking body 100 preferably has a length L ranging between 5 mm and 8 mm. The external diameter D in the fully expanded state is between 4 mm and 6 mm. The constricted, central longitudinal section 1112 has a diameter d of less than 1.5 mm. The diameter of the individual wires 1102 is preferably slightly less than 0.1 mm. The weld beads 1120 at the free ends 1118 of the wires have a diameter of greater than 0.1 mm, the latter preferably being at least 0.12 mm. Hence, the marking body 100 is suitable for use with an implantation apparatus 1004 in which the difference between an internal cannula diameter DKI and a driving-out element external diameter DA is no more than 0.1 mm—even when the manufacturing tolerances are taken into account.

What can likewise be gathered from FIG. 16 is that the free longitudinal ends 1118 of the wires 1102 are not only welded to one another but also twisted around one another. This together ensures that the interconnected longitudinal ends of the wires do not separate from one another because the forces as a result of the prestress in the cannula then do not act in their entirety on the weld site but are partly or wholly absorbed by the twist.

Unlike what is depicted in idealized fashion in the figures, the longitudinal ends of the individual wires 1102 are not all exactly in one (separation) plane 1212 (see FIGS. 19 and 20), but are alternately slightly offset in relation to such an idealized plane, preferably in the longitudinal direction. This has the advantageous effect that the marking body 100 can be better compressed at its longitudinal ends 1118 because the weld beads 1120 are not all located next to one another but are at least partly slightly offset from one another in the longitudinal direction of the marking body 100.

In its fully expanded state, the flared longitudinal sections 1114 and 1116 thereof adopt an angle α in relation to a longitudinal axis of said marking body 100, the angle preferably being between 30° and 45°.

In the constricted, central longitudinal section, the marking body 100' may have a sleeve 1122 which causes the marking body 100' to remain compressed in any case in this central longitudinal section 1112. The sleeve 1122 may consist of the same material— specifically preferably nitinol—as the individual wires 1102. However, the sleeve 1122 may preferably also be produced from a radiopaque material, for example gold. The sleeve 1122 is preferably welded to at least one of the wires 1102 by means of at least one weld spot 1124 and thus secured against displacement. The wire ends need not be welded if a sleeve 1122 is provided.

The dimensions of the marking body 100' with a central sleeve 1122 preferably correspond approximately to those of the marking body 100. Accordingly, the length L2 of the marking body 100' preferably is between 5 mm and 10 mm. In the fully expanded state, the maximum diameter D2 of the marking body 100' is preferably between 4 mm and 6 mm. The central sleeve 1122 preferably has a diameter d2 that is less than 2 mm, preferably less than 1.8 mm, and particularly preferably less than 1.0 mm. The length h of the sleeve 1122 is preferably less than 2 mm; see FIG. 17.

The marking body 100 or the marking body 100' is preferably formed from a braided wire mesh 1200, as depicted in FIG. 18 in exemplary fashion. FIG. 18 shows a braided wire mesh 1200 as a section of a braided wire tube 1202 (see FIG. 19), which is braided from 24 individual wires in the depicted example. The braided wire mesh 1200 that will form the marking body 100 or 100' is formed from 24 individual wires 1102 which cross under or over one another nine times between their longitudinal ends 1118 and which are twisted around one another and welded to one another at their longitudinal ends 1118 in pairs such that the braided wire mesh 1200 has respective weld beads 1120 at the longitudinal ends 1118 of the wires 1102. As can be gathered from FIG. 18, the longitudinal ends 1118 of the interconnected wires 1102 are not only welded to one another but also twisted around one another.

In another embodiment, the marking body 100' can be manufactured from a simple braided wire mesh 1200 without twists 1206. In this embodiment, the wire ends need not be welded to one another since the sleeve 1122 keeps the braided mesh stable.

To produce a braided wire mesh 1200 as depicted in FIG. 18, a wire tube 1202 as depicted in FIG. 19 is produced first. To produce the tube 1202, 24 individual wires 1102, for example, are braided with one another such that they alternately cross over and under one another at crossing points 1110. Crossing point planes 1210 that extend transversely to a longitudinal direction of the tube 1202 arise in this way. Once the individual wires 1102 have each crossed one another in pairs nine times, two individual wires are twisted around one another in each case such that twists 1206 arise. The wire tube 1202 thus forms crossing point planes 1210 that alternate with separating planes 1202 at which a respective braided wire mesh 1200 should be separated from the wire tube 1202. In the example illustrated, nine crossing point planes 1210 are followed in each case by a respective separation plane 1212. In the separation planes, the wires 1102 are in each case fully wrapped about one another twice in pairs such that a wrap-around angle of 720° arises. In other exemplary embodiments not shown, the wrap-around angle can also be only 360° or else 540°.

FIG. 20 shows the tube 1202 formed by the wires 1102, the tube 1202 having been separated at two separation sites 1214 by means of a laser beam. The separation sites 1214 are situated in precisely one separation plane 1212, that is to say where the twists 1206 are situated. The weld beads 1120 arise from the laser cutting such that the then free, pairwise interconnected longitudinal ends 1118 of the wires 1102 are interconnected both by twisting and by laser welding.

FIGS. 21 and 22 once again show perspective views of a marking body 100.

The individual webs may have different diameters and also different cross-sectional shapes. FIGS. 23a to 23h show different cross-sectional shapes. By way of example, the webs can be formed as a round solid wire and have a cross section as depicted in FIG. 23a. Preferably, the webs consist of a hollow wire—that is to say a type of tube—which may have a cross section as depicted in FIG. 23b. Such a hollow wire is advantageous in that it reflects particularly well on account of the acoustic impedance differences between the material of the wire wall and the hollow interior. FIGS. 23c and 23d illustrate that the cross-sectional form can also be polygonal, in particular quadrilateral. FIGS. 23e and 23f show a triangular cross-sectional form for webs, in the form of solid material (FIG. 23e) or as hollow webs (FIG. 23f). FIGS. 23g and 23h illustrate that webs in principle can each have an arbitrary, prismatic cross-sectional shape, and hence also for example a hexagonal shape as shown in FIGS. 23g and 23h.

Since the marking body 100 is preferably formed from a braided wire mesh, the wires typically contact each other once at the crossing points. Then, a crossing point can have an appearance as depicted in exemplary fashion in FIG. 24a. A secure connection between two crossing wires can be produced by welding at such a crossing point. FIG. 24b illustrates this on the basis of a weld spot 118 on the crossing point. Should the webs not be braided but simply only contact one another laterally in an arc, as depicted in FIG. 24c, a stable marking body can also be produced by virtue of the fact that the contacting webs are connected by welding, as depicted in FIG. 24d. A weld spot 118 is also shown here.

Finally, the webs can also be twisted at the crossing points. FIG. 24e shows a twist, within the scope of which the webs are wrapped around one another by 360° and are subsequently interconnected by means of a weld spot 118; see also FIG. 24f. Instead of a 360° twist, a 180° twist is also sufficient. The arising image then is similar to FIG. 24c, with the exception that the webs are then hooked in one another.

FIGS. 25a to 25f illustrate that the webs can be connected by welding (FIG. 25b), by twisting (FIGS. 25c and 25e), or by twisting and welding (FIGS. 25d and 25f) not only at crossing points but also at their free longitudinal ends 112. Weld beads 120 that typically have a larger diameter than an individual web 103 or a wire that forms a web 103 arise as a result of welding the webs 103 at their free longitudinal ends 112.

FIGS. 26 and 27 finally show an implantation apparatus 1004 for implanting a marking body 100. As already explained in conjunction with FIG. 10, the implantation apparatus 1004 comprises a handle 1010 and an implantation part 1008. The cannula 1006, in which the marking body 100 is initially situated, is part of the implantation part 1008.

FIG. 26a shows the implantation apparatus 1004 having the sliding element 1016 and the driving-out element 1018 in the pre-loaded position. Consequently, the implantation system 1000 is prepared for use and contains the marking body 100 (not visible as it is arranged in the cannula 1006). A protective sleeve 1024 is provided for protection against injury. FIG. 26b shows the implantation apparatus 1004 having the sliding element 1016 and the driving-out element 1018 in the driving-out position, in which the marking body has been ejected.

A cannula tip 1012 at the distal end of the cannula 1006 has been whetted in such a way that it facilitates a percutaneous implantation of the marking body 1100 by piercing the cannula 1006 into body tissue. The cannula 1006 preferably consists of stainless steel.

To eject the marking body 100 from the cannula 1006, provision is made of a displaceable driving-out element 1018, which can be actuated from the handle 1010 by means of the sliding element 1016.

By means of the implantation apparatus, a marking body of the type presented here for percutaneous marking can be implanted into soft tissue, such as breast tissue or axillary lymph nodes following a lymph node biopsy.

The fields of application include the marking of suspicious tissue, the marking of lesions before or during chemotherapy, and the marking of a biopsy removal site. The location of a removed tumor may likewise be marked for improved orientation within the scope of radiation treatment planning.

By way of example, within the scope of an intervention, the marking body is used as follows:

Initially, the marking body is implanted at a desired site by virtue of the distal end 1012 of the cannula 1006 of the implantation apparatus 1004 being pierced up to the desired implantation location in body tissue and a marking body 100 being ejected from the distal end 1012 of the cannula 1006.

Subsequently, the body tissue can be examined using an imaging ultrasound method, an ultrasound recording of the marked tissue being made. The marking body can be recognized in the ultrasound recording on account of a circular artifact 1300 or X-shaped artifact 1302; see FIGS. 28 and 29.

LIST OF REFERENCE SIGNS

100, Marking body
102, 104 Flared longitudinal sections
103 Webs
105 Crossing points
106 Central longitudinal section
108 Meshes
110 Longitudinal axis
118 Weld spot
120 Weld bead
L1 Length of the marking body
A1 Maximum external diameter of the marking body in the flared longitudinal sections
I1 Internal diameter of the marking body in the central longitudinal section
301 Braided wire mesh
302, 304 Flared longitudinal sections
306 Central longitudinal section
308 Wires
310 Crossing points
312 Free ends of the wires
L2 Length of the marking body
A2 Maximum external diameter of the marking body in the flared longitudinal sections
502 Central longitudinal section
504 Longitudinal axis of the marking body
506, 508 Flared longitudinal sections
W1 Angle of the spiral support structure
L3 Length of the marking body
A3 Maximum external diameter of the marking body in the flared longitudinal sections
702, 704 Flared longitudinal sections
706 Central longitudinal section
L4 Length of the marking body
A4 Maximum external diameter of the marking body in the flared longitudinal sections
I2 Internal diameter of the marking body in the central longitudinal section
S1 Provision of a tubular braided wire mesh
S2 Compression of the tubular braided wire mesh in its longitudinal direction
S3 Partial invagination of the braided wire mesh
S4 Constriction of the braided wire mesh in a central longitudinal section
DKI Internal cannula diameter
DKA External cannula diameter
BKA External diameter
LKA Cannula length
1000 Implantation system
1004 Implantation apparatus
1006 Cannula
1008 Implantation part
1010 Handle
1012 Cannula tip
1014 Handle housing
1016 Sliding element
1018 Driving-out element
1020 Pre-loaded position
1022 Driving-out position
1024 Protective sleeve
1102 Wires
1104 Braided wire mesh
1106, 1108 Longitudinal ends of the marking body
1110 Crossing point
1112 Central longitudinal section
1114, 1116 Flared longitudinal sections
1118 Longitudinal ends of the webs
1120 Weld beads
1122 Sleeve
1124 Weld spot
1200 Braided wire mesh
1202 Wire tube
1206 Twist
1210 Crossing point planes
1212 Separation plane
1214 Separation points
1300 Circular artifact
1302 X-shaped artifact

The invention claimed is:

1. A marking body for marking body tissue, the marking body having a longitudinal axis and being rotationally symmetric in relation to the longitudinal axis, wherein the marking body is formed by interconnected, elastic, preformed metal webs, the metal webs forming a lattice structure with a plurality of crossing points, respective portions of each of the metal webs being affixed to each other at each of the crossing points of the lattice structure, wherein the marking body is configured to transition between a radially compressed state and a radially expanded state, wherein, when the marking body is in the radially expanded state, the marking body is constricted in a central longitudinal section to form two flared longitudinal sections, a first flared longitudinal section widening outwardly along the longitudinal axis from a first side of the central longitudinal section and a second flared longitudinal section widening outwardly along the longitudinal axis from a second side of the central longitudinal section, each of the first and second flared longitudinal sections widening outwardly at a constant angle relative to the longitudinal axis from the central longitudinal section to each longitudinal end of the marking body such that a maximum external diameter of each of the first and second flared longitudinal sections is about two times to twenty times larger than an external diameter of the central longitudinal section, and at least the first and second flared longitudinal sections are formed by 5 to 96 webs in a circumferential direction of the marking body, and wherein, when the marking body is in the radially compressed state the metal webs forming the marking body extend along the longitudinal axis of the marking body and are interconnected in a force fit, interlocking, and/or cohesive fashion, such that a compressed length of the marking body, extending along the longitudinal axis, is greater than an expanded length of the marking body.

2. The marking body as claimed in claim 1, wherein the metal webs of the marking body are formed by 5 to 96 wires which each extend from one to the other longitudinal end of the marking body and which cross over one another multiple times to form the lattice structure.

3. The marking body as claimed in claim 2, wherein the respective portions of each of the metal webs of the marking body are fused to each other at each of the crossing points.

4. The marking body as claimed in claim 2, wherein the respective portions of each of the metal webs of the marking body are twisted together at each of the crossing points.

5. The marking body as claimed in claim 2, wherein the respective portions of each of the metal webs of the marking body are welded to each other at each of the crossing points.

6. The marking body as claimed in claim 1, wherein the metal webs of the marking body are pairwise interconnected at respective longitudinal ends of the metal webs.

7. The marking body as claimed in claim 1, wherein the metal webs of the marking body are formed from a titanium alloy.

8. The marking body as claimed in claim 1, wherein the central longitudinal section comprises a sleeve which compresses the central longitudinal section to a minimal diameter.

9. The marking body as claimed in claim 1, wherein at least one web is at least partly hollow.

10. An implantation system having a marking body as claimed in claim 1 and an implantation apparatus with a cannula, the marking body being situated within the cannula and being configured to move out of the cannula by actuating the implantation apparatus.

11. The implantation system as claimed in claim 10, wherein the implantation system is configured for application within a vacuum biopsy unit, wherein the cannula has a lateral opening for driving out the marking body.

12. The marking body as claimed in claim 1, wherein the metal webs of the marking body are both welded and twisted together at respective longitudinal ends of the metal webs.

13. The marking body as claimed in claim 1, wherein the metal webs of the marking body are formed from nitinol.

14. The marking body as claimed in claim 1, wherein, the constant angle relative to the longitudinal axis ranges from about 25° to about 50°.

15. The marking body as claimed in claim 1, wherein, when the marking body is in the radially expanded state, the marking body has an expanded length extending along the longitudinal axis of about 6 mm to about 7 mm.

16. The marking body as claimed in claim 1, wherein, when the marking body is in the radially expanded state, the maximum external diameter of each of the first and second flared longitudinal sections is between about 4 mm and about 6 mm and the external diameter of the central longitudinal section is less than about 1.5 mm.

17. A method for producing a marking body for marking body tissue, the method including:

forming a tubular braided wire mesh, which has a longitudinal axis, two longitudinal ends and is formed by 5 to 96 braided individual wires having a plurality of crossing points, affixing respective portions of each of the braided individual wires to each other at each of the crossing points to form an interconnected lattice structure, constricting the tubular braided wire mesh in a central longitudinal section such that the tubular braided wire mesh, starting from the central longitudinal section, widens at a constant angle on each side of the central longitudinal section in a longitudinal direction of the tubular braided wire mesh from the central longitudinal section to each longitudinal end to form two flared longitudinal sections, and cutting the tubular braided wire mesh in a plane extending perpendicular to the longitudinal axis of the braided wire mesh on both sides of the central longitudinal section to form a marking body having a length extending along the longitudinal axis of about 6 mm to about 7 mm.

18. The method as claimed in claim 17, further including:
connecting free ends of the braided wire mesh resulting from the cutting, the connecting of the free ends being able to be implemented before or after the cutting by twisting and/or before, during, or after the cutting by welding.

19. The method as claimed in claim 17, wherein cutting the tubular braided wire mesh comprises cutting the tubular braided wire mesh at crossing points located on a plane that extends transversely to the longitudinal axis of the tubular braided wire mesh.

20. An ultrasound marker for marking soft body tissue, the ultrasound marker having a longitudinal axis and being rotationally symmetric in relation to the longitudinal axis, wherein the ultrasound marker is configured to transition between a radially compressed state and a radially expanded state, wherein, when the ultrasound marker is in the radially expanded state, the ultrasound marker is constricted in a central longitudinal section to form two flared longitudinal sections, a first flared longitudinal section widening outwardly along the longitudinal axis from a first side of the central longitudinal section and a second flared longitudinal section widening outwardly along the longitudinal axis from a second side of the central longitudinal section, each of the first and second flared longitudinal sections widening outwardly at a constant angle relative to the longitudinal axis from the central longitudinal section to each longitudinal end of the ultrasound marker, and wherein, when the ultrasound marker is in the radially expanded state, the first and second flared longitudinal sections are configured to provide an artifact under ultrasound imaging of the ultrasound marker, wherein the artifact includes a conical shape when the ultrasound marker is viewed from a side of the ultrasound marker.

\* \* \* \* \*